(12) United States Patent
Nelson

(10) Patent No.: US 7,841,131 B2
(45) Date of Patent: *Nov. 30, 2010

(54) LIGHT TRAP FOR INSECTS

(75) Inventor: Thomas D. Nelson, Maplewood, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/972,456

(22) Filed: Oct. 5, 2001

(65) Prior Publication Data

US 2002/0032980 A1 Mar. 21, 2002

Related U.S. Application Data

(63) Continuation-in-part of application No. 09/604,488, filed on Jun. 27, 2000, now Pat. No. 6,493,986, which is a continuation of application No. 09/250,932, filed on Feb. 18, 1999, now abandoned, which is a continuation of application No. 08/686,432, filed on Jul. 26, 1996, now abandoned, which is a continuation of application No. 08/342,904, filed on Nov. 21, 1994, now abandoned, which is a continuation-in-part of application No. 08/000,264, filed on Jan. 4, 1993, now Pat. No. 5,365,690.

(51) Int. Cl.
*A01M 1/08* (2006.01)

(52) U.S. Cl. ........................................................ 43/113
(58) Field of Classification Search .................. 43/113, 43/114
See application file for complete search history.

(56) References Cited

U.S. PATENT DOCUMENTS

| | | | |
|---|---|---|---|
| 944,882 | A | 12/1909 | Laube |
| 970,784 | A | 9/1910 | Buhm |
| 1,009,580 | A | 11/1911 | Robinson |
| 1,019,410 | A | 3/1912 | Baker |
| 1,280,359 | A | 10/1918 | Abresch |

(Continued)

FOREIGN PATENT DOCUMENTS

CA 656989 1/1963

(Continued)

OTHER PUBLICATIONS

"Electronics, Adhesive Offer Sanitary Fly Control," *Competitive Literature Review, Publication: Pest Control*, Nov. 1992.

(Continued)

*Primary Examiner*—Christopher P Ellis
(74) *Attorney, Agent, or Firm*—Andrew D. Sorensen; Laura C. Dilorenzo; Amy J. Hoffman

(57) ABSTRACT

Several embodiments of an insect trap using attractant light displayed on a projection surface are disclosed. The insect trap can be mounted on a vertical surface such as a wall or on a horizontal surface such as a ceiling. The trap has a light source configured to direct substantially all light from the source to the projection surface. Insects attracted by the light pattern on the projection surface are immobilized on an adhesive surface. A method of trapping insects is also disclosed.

27 Claims, 12 Drawing Sheets

U.S. PATENT DOCUMENTS

| | | | |
|---|---|---|---|
| 1,304,397 A | 5/1919 | Snead | |
| 1,333,454 A | 3/1920 | Sato | |
| 1,607,413 A | 11/1926 | Tillson | |
| D77,408 S | 1/1929 | Hall | |
| 1,732,272 A | 10/1929 | Kurtz | |
| D80,735 S | 3/1930 | Lazerson | |
| 1,751,130 A | 3/1930 | Cornelius et al. | |
| D81,664 S | 7/1930 | Rubins | |
| 1,820,813 A | 8/1931 | Loomis | |
| D109,522 S | 5/1938 | Perkins | |
| D110,451 S | 7/1938 | Arenberg | |
| 2,177,846 A | 10/1939 | Swangren | |
| D128,175 S | 7/1941 | Rebechini | |
| 2,286,568 A | 6/1942 | Petry | |
| 2,384,930 A | 9/1945 | Kendrick | |
| D160,809 S | 11/1950 | Schear | |
| D162,345 S | 3/1951 | Roney | |
| 2,577,436 A | 12/1951 | Smith | |
| 2,645,877 A | 7/1953 | Pohlman | |
| 2,731,762 A | 1/1956 | Jones | |
| 2,786,298 A | 3/1957 | Smith | |
| 2,787,083 A | 4/1957 | Jones | |
| 2,791,864 A | 5/1957 | Chappell | |
| 3,023,539 A * | 3/1962 | Emerson | 43/113 |
| 3,059,373 A | 10/1962 | Gardner | |
| 3,187,458 A | 6/1965 | Densmore | |
| 3,305,965 A | 2/1967 | Cornell, III | |
| 3,346,988 A | 10/1967 | Pickering | |
| 3,348,332 A | 10/1967 | Fee et al. | |
| 3,465,468 A * | 9/1969 | Takamoto | 43/113 |
| 3,491,478 A | 1/1970 | Gilbert | |
| 3,513,585 A | 5/1970 | Ross | |
| 3,540,145 A | 11/1970 | McEwen | |
| D221,893 S | 9/1971 | Peasley | |
| 3,653,145 A | 4/1972 | Stout | |
| 3,685,198 A | 8/1972 | Smith | |
| D225,631 S | 12/1972 | Gilbert | |
| 3,768,196 A | 10/1973 | Iannini | |
| 3,913,259 A | 10/1975 | Nishimura et al. | |
| 3,998,000 A | 12/1976 | Gilbert | |
| 4,027,151 A | 5/1977 | Barthel | |
| 4,044,494 A | 8/1977 | Grajnert | |
| 4,074,457 A * | 2/1978 | Sato | 43/113 |
| 4,117,624 A | 10/1978 | Phillips | |
| 4,127,961 A | 12/1978 | Phillips | |
| 4,141,173 A | 2/1979 | Weimert et al. | |
| 4,147,947 A * | 4/1979 | Hoeh | 313/27 |
| 4,157,629 A | 6/1979 | Parks | |
| D253,606 S | 12/1979 | Yavnieli | |
| 4,212,129 A | 7/1980 | Shumate | |
| 4,229,779 A | 10/1980 | Bilson et al. | |
| 4,332,100 A | 6/1982 | Schneider | |
| 4,366,643 A | 1/1983 | Boaz | |
| D269,632 S | 7/1983 | Roberston et al. | |
| 4,411,093 A | 10/1983 | Stout et al. | |
| 4,442,624 A * | 4/1984 | Browne | 43/107 |
| 4,490,937 A | 1/1985 | Yavnieli | |
| 4,490,938 A | 1/1985 | Baker | |
| 4,577,434 A | 3/1986 | Davis | |
| D286,206 S | 10/1986 | Joosten | |
| D288,247 S | 2/1987 | De Lucchi | |
| 4,686,789 A | 8/1987 | Williams | |
| 4,694,604 A | 9/1987 | Mitchell | |
| 4,696,126 A | 9/1987 | Grothaus et al. | |
| D292,525 S | 10/1987 | Van Deelen | |
| D292,531 S | 10/1987 | Van Deelen | |
| 4,700,506 A | 10/1987 | Williams | |
| D298,260 S | 10/1988 | Yoshida et al. | |
| D298,360 S | 11/1988 | Dacanay et al. | |
| D298,661 S | 11/1988 | Gismondi | |
| 4,829,702 A | 5/1989 | Silvandersson | |
| 4,841,669 A | 6/1989 | Demarest | |
| 4,876,822 A * | 10/1989 | White | 43/113 |
| 4,918,856 A | 4/1990 | Olive et al. | |
| D308,260 S | 5/1990 | Shemitz | |
| D309,791 S | 8/1990 | Boccato et al. | |
| D309,792 S | 8/1990 | Mangiarotti | |
| D309,795 S | 8/1990 | Sahlen | |
| D309,972 S | 8/1990 | Chiba | |
| 4,949,501 A * | 8/1990 | Larkin | 43/113 |
| D311,256 S | 10/1990 | Frattini | |
| 4,959,923 A | 10/1990 | Aiello et al. | |
| 4,979,329 A | 12/1990 | Olive et al. | |
| 4,992,268 A | 2/1991 | Landolt et al. | |
| 4,999,754 A * | 3/1991 | Gary | 362/237 |
| D316,306 S | 4/1991 | Shemitz | |
| D319,320 S | 8/1991 | Wilda | |
| 5,044,112 A | 9/1991 | Williams | |
| 5,046,280 A | 9/1991 | Foster et al. | |
| D320,668 S | 10/1991 | Kluck | |
| D323,906 S | 2/1992 | Miranda | |
| 5,090,153 A | 2/1992 | Mullen | |
| D324,742 S | 3/1992 | Kluck | |
| D325,954 S | 5/1992 | Lazzeroni, Sr. et al. | |
| 5,111,610 A | 5/1992 | Morisset | |
| 5,142,815 A | 9/1992 | Birdsong | |
| 5,170,583 A | 12/1992 | Coaker et al. | |
| D335,912 S | 5/1993 | Brown et al. | |
| 5,259,153 A | 11/1993 | Olive et al. | |
| 5,278,737 A | 1/1994 | Luce et al. | |
| D346,869 S | 5/1994 | Houssian | |
| D346,870 S | 5/1994 | Houssian | |
| 5,331,760 A | 7/1994 | DuMont | |
| 5,365,690 A * | 11/1994 | Nelson | 43/113 |
| 5,425,197 A | 6/1995 | Smith | |
| 5,505,017 A | 4/1996 | Nelson et al. | |
| 5,634,292 A * | 6/1997 | Kitterman | 43/113 |
| 5,651,211 A * | 7/1997 | Regan | 43/113 |
| 5,657,576 A | 8/1997 | Nicosia | |
| 5,713,153 A | 2/1998 | Cook et al. | |
| 5,722,199 A | 3/1998 | Demarest | |
| 5,974,727 A | 11/1999 | Gilbert | |
| D422,334 S | 4/2000 | Engelbrecht | |
| 6,108,966 A | 8/2000 | Otomo et al. | |
| 6,289,629 B2 * | 9/2001 | Greening | 43/113 |
| 6,493,986 B1 | 12/2002 | Nelson et al. | |
| 2002/0139040 A1 | 10/2002 | Burrows et al. | |
| 2003/0079398 A1 | 5/2003 | Holmes | |
| 2003/0089024 A1 | 5/2003 | Nelson et al. | |

FOREIGN PATENT DOCUMENTS

| | | |
|---|---|---|
| CH | 631324 | 8/1982 |
| DE | 373240 | 4/1923 |
| DE | 35 06 030 A1 | 8/1986 |
| DE | 3506030 A1 | 8/1986 |
| DE | 38 10 065 C1 | 4/1989 |
| DE | 3810065 | 4/1989 |
| DE | 38 40 440 A1 | 10/1989 |
| DE | 38 40 440 C2 | 8/1990 |
| FR | 2551322 | 3/1985 |
| JP | 50-35778 | 4/1975 |
| JP | 64-55137 | 3/1989 |
| JP | 2-174627 | 7/1990 |
| JP | 3-250501 | 11/1991 |
| WO | WO 82/00567 | 3/1982 |
| WO | WO 92/20224 | 11/1992 |

OTHER PUBLICATIONS

Gilbert Insect Light Traps product literature.
Hollingsworth, J. et al., "Effect of Components on Insect Light Trap Performance," *Transactions of the American Society of Agricultural Engineers*, vol. 15, No. 5, pp. 924-927.
I-O-C™ Insect-O-Cutor product literature.

Micro-Gen Introduces: The Vector™ Fly System product literature.
Pickens, L. et al., "Design Parameters That Affect the Performance of UV-emitting Traps in Attracting House Flies (Diptera: Muscidae)", *Journal of Economic Entomology*, vol. 79, No. 4, pp. 1003-1009 (Aug. 1986).
Venus Flylite™ product literature.
Brochure, "ZAP® Insect-Electrocutor 24-Hour Automatic, Positive, Non-Chemical Flying Insect Control," *Gardner Manufacturing Co.*, 16 pgs. (1972).
"The Fly Terminal™," *Frank Miller & Sons*, 2 pgs. (1993).
Brochure, "Venus Flylite™," *Atlantic Research & Development, Inc.*, 4 pgs. (1989).
Hollingsworth, J. et al., "Effect of Components on Insect Light Trap Performance," *Transactions of the ASAE*, vol. 15, No. 5, 4 pgs. (1971).
Brochure, "Venus Flylite™," 6 pgs. (Jun. 1992).
Brochure, "ZAP® Gardner Insect-Electrocutor Systems, 24-hour Automatic, Positive, Non-Chemical Fly & Insect Control," *Gardner Manufacturing Co.*, Catalog No. 301, 8 pgs. (publicly known prior to Jan. 4, 1993).
Article, "Insect Traps for Use With Electric Radiant Energy Sources," *Source Unknown*, 4 pgs. (publicly known prior to Jan. 4, 1993).
"Stop 'um Silent Insect Containment Unit Zap 'em.," *Gardner Manufacturing Company*, 2 pgs. (1989).
Advertisement, "Stop 'um," *Gardner Manufacturing Co.*, 1 pg. (publicly known prior to Jan. 4, 1993).
Brochure, "Sanitary, Effective Fly Control for Food Handling and Other Sensitive Areas," *Vector Fly System*, 18 pgs. (publicly known prior to Jan. 4, 1993).
Brochure, "Zap Flying Insect Electrocuting Systems," *Gardner Manufacturing Co.*, 6 pgs. (publicly known prior to Jan. 4, 1993).
Catalog, "Insect Light Traps," *Don Gilbert Industries, Inc.*, 16 pgs. (publicly known prior to Jan. 4, 1993).
Catalog, "Gilbert®: Insect Light Traps," *Don Gilbert Industries, Inc.*, 32 pgs. (publicly known prior to Jan. 4, 1993).
Advertisement, "The Fly Magnet," *Ecolab®*, 2 pgs. (publicly known prior to Jan. 4, 1993).
"Flying Insect Control: Part 2, A Profit Opportunity" *A supplement to PCT Pest Control Technology Magazine*, 24 pgs., (Jun. 1998).
Advertisement, "Adhesive Insect Light Trap," *Gardner Manufactauring*, 2 pgs. (publicly known as early as Jan. 1, 1999).
Advertisement, "Adhesive Insect Light Traps," *Gardner Manufacturing*, 2 pgs. (publicly known as early as Jan. 1, 1999).
"Surface Lighting," *Halo Lighting*, 3 pgs. (1990).
Brochure, "The Orkin Commercial Fly Control System," *Orkin*, 4 pgs. (Jun. 1997).
Brochure, "Acurid Orkin Designer: Decorative Insect Light Trap," *Orkin Acurid*, 2 pgs. (publicly known after 1998 but prior to Oct. 5, 2001).
Various Internet pages of manufacturers who sell Gardner products, 80 pgs. (Jan. 2000).
Advertisement, "Affordable Fly Control, Choose Your Weapon!," *Anderson Environmental Systems*, 1 pg. (publicly known as early as Nov. 1994).
Advertisement, "Insect-O-Cuter®," www.pestcontrolmag.com Magazine, p. 16 (Apr. 2000).
Brochure, "The Insect Inn IV™ is their fatal attraction.," *Paraclipse, Inc.*, 3 pgs. (1997).
Brochure, "Paraclipse™ Terminator: A Fly's Worst Enemy," *Paraclipse, Inc.*, 6 pgs. (1999).
"IES Lighting Handbook: The Standard Lighting Guide, Sections 6, 10, 15 and 25" *Edited by John E. Kaufman, Published by Illuminating Engineering Society*, Fourth Edition, pp. 6-1-6-20; 10-1-10-30; 15-1-15-26; and 25-1-25-23 (1966).
"IES Lighting Handbook: The Standard Lighting Guide, Section 25" *Edited by John E. Kaufman and Jack F. Christensen, Published by Illuminating Engineering Society*, Fifth Edition, pp. 25-1-25-24 (1972).
"IES Lighting Handbook: Application Volume, Section 19" *Edited by John E. Kaufman and Howard Haynes, Published by Illuminating Engineering Society of North America*, pp. 19-1-19-40 (1981).
"IES Lighting Handbook: Application Volume, Section 19" *Edited by John E. Kaufman and Jack F. Christensen, Published by Illuminating Engineering Society of North America*, pp. 19-1-19-41 (1987).
Brochure, "Lunchtime, The Mantis," *Pest West, B&W Sales & Marketing*, 4 pgs. (1998).
Brochure, "Luralite: Attractive Flying Insect Control," *Luralite*, 4 pgs., (1999).
Brochure, "The Insect Inn IV™ is their fatal attraction.," *Paraclipse, Inc.*, 6 pgs. (1999).
"Prescription Treatment Food Safety," *Whitmire Micro-Gen Research Laboratories, Inc.*, 10 pgs. (Aug. 1999).
Flyers, "Fly Control for Restaurants: Adhesive Insect Light Trap Placement Strategies for Food Areas," *Gardner Manufacturing*, 2 pgs. (Jul. 1999).
Manual, "Vector System," *Micro-Gen Equipment Corp.*, pp. 1-9 (Oct. 1991).
Brochure, "No-Zap Flytraps will control your flying insect problem!!! We Guarantee It!!!," *CCI Industries, Inc.*, 4 pgs. (Apr. 1999).
Brochure, "Guardian® Hanging Fly Trap: Glueboard Model GBH362," *Insect-O-Cutor*, 1 pg. (Sep. 1998).
Brown, J., "A revolution in electronic fly traps," *Journal of Environmental Health*, pp. 267 (May/Jun. 1989).
Weidhaas, D. et al., "Insect Electrocuting Light Trap Research, First Edition," *Don Gilbert Industries, Inc.*, pp. 1-96 (Aug. 1988).
Sudjic, D., "The Lighting Book: A Complete Guide to Lighting Your Home," *Crown Publishers, Inc.*, 16 pgs. (1985).
"wil-kil.com: Focusing on Quality IPMI," http://www.wil-kil.com/index1024.html, 7 pgs. (Jun. 7, 2002).
"DecoCatch™ ILT," http://www.wil-kil.com/business/popups/dococatchdetails.html, 1 pg. (Jun. 6, 2002).
Gilbert, D. et al., "Gilbert® Strategic Installation of Professional Flytraps," http://www.gilbertinc.com/strategi.htm, 4 pgs. (Nov. 2002).
*Interior Design Magazine*, 3 pgs. (May 1990).
*Interior Design Magazine*, 2 pgs. (Apr. 1991).
*Interior Design Magazine*, 2 pgs. (Jun. 1991).
*Interior Design Magazine*, 2 pgs. (Jul. 1991).
*Interior Design Magazine*, 3 pgs. (Sep. 1991).
Catalog, "Surface Lighting," *Halo Lighting*, 5 pgs. (1990).
Catalog, "Progress Lighting Ideas," *Progress Lighting*, vol. 120, 5 pgs. (1990).
Catalog, "The Complete Home Furnishings Catalog," *Conran*, 2 pgs. (Spring 1989).
Catalog, "Halo Surface Lighting," *Halo Lighting*, 7 pgs. (Jan. 1987).
Catalog, "Scott 1988 Supplement: Wall Fixtures by Scott®," *Scott*, 2 pgs. (1988).
Catalog, "Boyd," *Boyd Lighting Company*, 11 pgs. (1987).
Advertisement, "The Mantis catches the small flies the others leave behind!," *PestWest™ Flying Insect Solutions*, 4 pgs. (Date Unknown).
Brochure, "The Lighted Fly Glue Trap. It's Outta Sight!," *Catchmaster*, 1 pg. (Date Unknown).
Brochure,"Introducing: The Lighted Fly Glue Trap. It's Outta Sight!," *Catchmaster*, 1 pg. (Date Unknown).
Brochure, "FICS: Flying Insect Control System: A Safe, Hygienic Answer to Flying Insects," *Rentokil*, 2 pgs. (Date Unknown).
Shaheen, L., "Light Traps Spark Focus on Prevention," *Pest Control*, 2 pgs. (Date Unknown, between May 1992 and May 1999).
Advertisement, "Make A Million Little Problems Disappear," *Ecolab Inc.*, 4 pgs. (1996).
Advertisement, "Flies: Stealth Fly Program," *Ecolab Inc.*, 4 pgs. (2000).
Price List, "Fly Killer Retail Price List," *P & L Systems LLC*, 1 pg. (publicly known after Jan. 4, 1993, but prior to Nov. 21, 1994).
Advertisement, "They're attracted to food. They're attracted to light. They're attracted to other flies. The Insect Inn II™ is their fatal attraction," *Paraclipse, Inc.*, 6 pgs. (1994).
"Selecting a Professional Flytrap," http://gilbertinc.com/gluetrap.htm, 5 pgs. (publicly known as early as Feb. 28, 2000).
Brochure, "See the Light with Ecolab's Latest Weapon for Flying Insect Defense: The Fly Magnet," *Ecolab Inc.*, 2 pgs. (publicly known prior to Jan. 4, 1993).

Brochure, "The Vector Fly System," *Micro-Gen Equipment Corp.*, 10 pgs. (publicly known prior to Jan. 4, 1993).
"Specifications Model 924 Flintrol," *Gilbert Electronics, Inc.*, 1 pg. (publicly known prior to Jan. 4, 1993).
Brochure, "The Vector Fly System simply works better than other fly control options for food handling areas," *Micro-Gen Equipment Corp.*, 6 pgs. (publicly known prior to Jan. 4, 1993).
Brochure, "WIL-KIL Sheds Light on the Future of Fly Control," *Wil-Kil Pest Control*, 2 pgs. (Date Unknown).
Brochure, "Flying Venus Wall Sconce/Fly Trap," *Gilbert Industries, Inc.*, 6 pgs. (publicly known after Jan. 4, 1993 but prior to Nov. 21, 1994).
Brochure, "Adhesive Insect Light Traps," *Orkin Acurid*, 1 pg. (publicly known as early as Jan. 1, 1999).
Brochure, "Adhesive Insect Light Traps," *Gardner Manufacturing*, 8 pgs. (publicly known as early as Jan. 1, 1999).
Brochure, "Fly Control for Restaurants," *Gardner Manufacturing*, 2 pgs. (publicly known as early as Jan. 1, 1999).
Catalog, "Gardner Insect Light Traps," *Gardner Manufacturing*, 8 pgs. (publicly known as early as Jan. 1, 1999).
Advertisement, "Stop Fly Problems! Get the *Mirage* WS-50 decorative Fly Light," *Gardner Manufacturing*, 11 pgs. (publicly known as early as Nov. 1994).
Catalog, "Gardner Environmental Products: Insect Light Traps," *Gardner Manufacturing*, 8 pgs. (publicly known as early as Nov. 1994).
Advertisement, "WS-50," *Gardner Manufacturing*, 2 pgs. (publicly known as early as Nov. 1994).
Advertisement, "WS-50 Adhesive Insect Light Trap," *Gardner Manufacturing*, 2 pgs. (publicly known as early as Nov. 1994).
"Product Catalog," *Gardner Manufacturing Environmental Products Division*, 8 pgs. (publicly known as early as Nov. 1994).
Brochure, "GT-200, We put fly control in a new light!," *Source Unknown*, 4 pgs. (publicly known as early as Nov. 1994).
Brochure, "Gardner Environmental Products, Insect Light Traps," Gardner Manufacturing, 8 pgs. (publicly known as early as Nov. 1994).
"Gardner Environmental Products, Product Catalog," Gardner Manufacturing, 8 pgs. (publicly known as early as Nov. 1994).
Advertisement, "Capture Flies in Style, "Diamond V" Wall Sconce/Insect Light Trap," *Gardner Manufacturing*, 2 pgs. (publicly known as early as Nov. 1998).
Winona Lighting Internet Catalog of Wall Sconces, www.artemide.com/cgi/page_ds.php?fam & pro & lan=2&lin=4&vet=0, www.lightwayind.com; www.visalighting.com, and www.winonalighting.com, 28 pgs. (known to Applicant as of Mar. 2000).
"Gardner Insect Control," *Gardner Manufacturing*, http://www.gardnermfg.com/insect/, 20 pgs. (known to Applicant as of May 9, 2002).
Various Web Pages of manufacturers in the industry, 26 pgs. (known to Applicant as of Aug. 26, 2002).
"No Zap Flytraps," http://www.amer-rest-equip.com/cci/cci_zap.html, 2 pgs. (known to Applicant as of Aug. 26, 2002).
B & G Equipment Company, http://bgequip.com/, 5 pgs. (known to Applicant as of Aug. 26, 2002).
Luralite, http://www.bugspray.com/catalog/products/page1442.html, 2 pgs. (known to Applicant as of Aug. 26, 2002).
Catchmaster, http://www.catchmaster.com/, 14 pgs. (known to Applicant as of Aug. 26, 2002).
Country Vet, http://www.country-vet.com/indProduct.php4?itemNum=xxxxxxx, (known to Applicants as of Aug. 26, 2002).
"Advantage Traps Flytraps, and interesting Fly Facts," http://www.flyfacts.com/HTML/uses.htm, 4 pgs. (known to Applicants as of Aug. 26, 2002).
Fly Traps, http://www.flytrappers.com/luralite.htm, 2 pgs. (known to Applicant as of Aug. 26, 2002).
"Insectu-O-Cutor Insect Control Products," http://www.germ-o-ray.com/iocpages/iocprods.html, 2 pgs. (known to Applicant as of Aug. 26, 2002).
"Gilbert Website Central," http://www.gilbertinc.com/, 29 pgs. (known to Applicant as of Aug. 26, 2002).
"Insect Control World-Insect Control and Fly Trap Devices by Restaurant Equipment," http://www.insectcontrolworld.com/, 6 pgs. (known to Applicant as of Aug. 26, 2002).
"Starkeys Products," http://members.iinet.net.au/~starkey/, 12 pgs. (known to Applicant as of Aug. 26, 2002).
"Paraclipse, Inc., Columbus, NE, feature the Insect Inn IV and Terminator automated," 16 pgs. (known to Applicant as of Aug. 26, 2002).
"Advantage Fly Trap," http://www.pestproducts.net/flytrap.htm, 2 pgs. (known to Applicant as of Aug. 26, 2002).
"PestWest-Flying Insect Solutions," http://www.pestwest.com/home.cfm?lang=3, 5 pgs. (known to Applicant as of Aug. 26, 2002).
"Flying Insect: Introducing Aurora 360," http://www.watco.com/aurora2.htm, 5 pgs. (known to Applicant as of Aug. 26, 2002).
Whitemire Micro-Gen Research Laboratories, Inc. Website, http://www.wmmg.com/default.htm, 17 pgs. (known to Applicant as of Aug. 26, 2002).
Gilbert, D. et al., "Strategic Installation of Insect Light Traps," *Gilbert Manufacturing*, pp. 4-19 (publicly known after 1998 but prior to Oct. 5, 2001).
Catalog, "Gilbert Professional Flytraps," *Gilbert Manufacturing*, 21 pgs. (publicly known after 1998 but prior to Oct. 5, 2001).
Brochure, "Illumé, the first name in discreet insect control," *ACtron Incorporated*, 1 pg. (Date Unknown, although not publicly known prior to Jan. 5, 1993).
Brochure, " Illumé stylish insect control," *ACtron Incorporated*, 2 pgs. (Date Unknown, although not publicly known prior to Jan. 5, 1993).
"B&G's Integrated House Fly Program," *B&G* Equipment Company, pp. 1-33, (Date Unknown, although not publicly known prior to Jan. 5, 1993).
"Fly Control Solutions," *B&G* Equipment Company, pp. 1-8 (Date Unknown, although not publicly known prior to Jan. 5, 1993).
"Do you recognize this threat to food safety?," *Ecolab Inc.*, 4 pgs. (Date Unknown, although not publicly known prior to Jan. 5, 1993).
"Dedicated to Hygiene," *P+L Systems LLC*, 21 pgs. (Date Unknown, although not publicly known prior to Jan. 5, 1993).
Brochure, "Meet the Bacteria Brothers," *Paraclipse, Inc.*, 2 pgs. (Date Unknown, although not publicly known prior to Jan. 5, 1993).
Photographs of Device GT-100, 1 pg. (publicly known prior to Jan. 4, 1993).
Photographs of the Vector Flying Insect Trap, 3 pgs. (Date Unknown).
Photographs of wall sconces, 4 pgs. (publicly known prior to Jan. 4, 1993).
Photographs of Progress Lighting Model No. P7101-30, 2 pgs. (Date Unknown).
"Progress Lighting Ideas," *Ja-Mar Elec. Supply/Lighting*, 2 pgs. (Date Unknown).
"CB Aurora 360, Illuminated Fly Trap System with Scented Pheromone Attractant," *CB Waterbury Companies, Inc.*, 4 pgs. (1997).
"The Vector Fly System," *Whitmire Micro-Gen Research Laboratories, Inc.*, 4 pgs. (Date Unknown).
Photographs of Device: Carol Clamp Light Model #04170.94.MP, A277-894, *TF Carol Cable Company*, 3 pgs. (Date Unknown).
Photographs of HALO Lighting Metro Quarter Sphere Model No. H2572PB, 2 pgs. (Date Unknown).
Photographs of VISA Lighting wall sconce CB 2220, 2 pgs. (publicly known prior to Jan. 4, 1993).
Photographs of VISA Lighting wall sconce CB 3020, 2 pgs. (publicly known prior to Jan. 4, 1993).
Photographs of VISA Lighting wall sconce CB 3024, 2 pgs. (publicly known prior to Jan. 4, 1993).
Photographs of VISA Lighting wall sconce CB 3082, 2 pgs. (publicly known prior to Jan. 4, 1993).
Photographs of VISA Lighting wall sconce CB 2850, 2 pgs. (publicly known prior to Jan. 4, 1993).
Goldsmith, T. et al., "The Sensitivity of Housefly Photoreceptors In The Mid-Ultraviolet And The Limits Of The Visible Spectrum," *J. Exp. Biol.*, vol. 49, No. 3, pp. 669-677 (Dec. 1968).

Syms, P. et al., "The effect of flickering U-V light output on the attractiveness of an insect electrocutor trap to the house-fly, *Musca domestica*," *Entomol. exp. appl.*, vol. 43, No. 1, pp. 81-85 (Feb. 1987).

Roberts, A. et al., "Intensity and spectral emission as factors affecting the efficacy of an insect electrocutor trap towards the house-fly," *Entomol. exp. appl*, vol. 64, No. 3, pp. 259-268 (Sep. 1992).

Lillie, T. et al., "Operational Testing of Electrocutor Traps for Fly Control in Dining Facilities," *Journal of Economic Entomology*, vol. 80, No. 4, pp. 826-829 (Aug. 1987).

Thimijan, R. et al., "A Method for Predicting House Fly Attraction of Electromagnetic Radiant Energy," *Journal of Economic Entomology*, vol. 66, No. 1, pp. 95-100 (Feb. 15, 1973).

Miall, R., "The flicker fusion frequencies of six laboratory insects, and the response of the compound eye to mains fluorescent 'ripple'," *Physiological Entomology*, vol. 3, No. 2, pp. 99-106 (Jun. 1978).

Pickens, L. et al., "Design Parameters That Affect the Performance of UV-emitting Traps in Attracting house Flies (Diptera: Muscidae)," *Journal of Economic Entomology*, vol. 79, No. 4, pp. 1003-1009 (Aug. 1986).

Pickens, L. et al., "Design Parameters That Affect the Performance of UV-emitting Traps in Attracting house Flies (Diptera: Muscidae)," *Journal of Economic Entomology*, vol. 79, No. 4, pp. 1003-1009 (Aug. 1986).

Competitive Literature Review, "Electronics, adhesive offer sanitary fly control," *Pest Control*, 1 pg. (Nov. 1992).

Daniel N. Lapedes, McGraw-Hill, "Dictionary of Scientific and Technical Terms", 7 pgs.

* cited by examiner

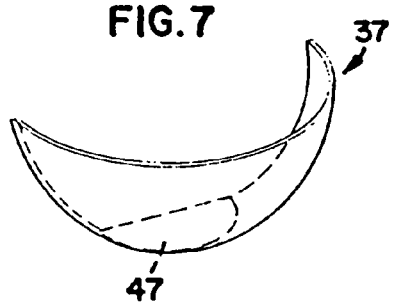
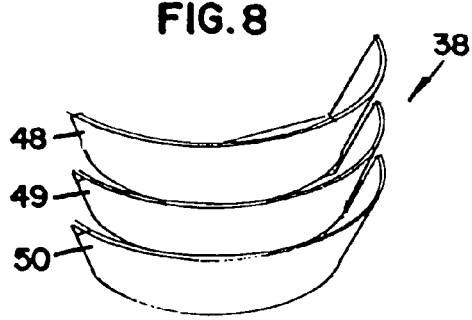
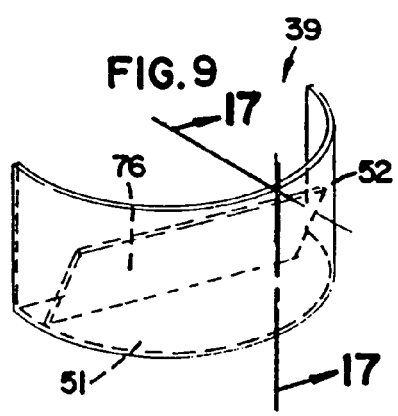
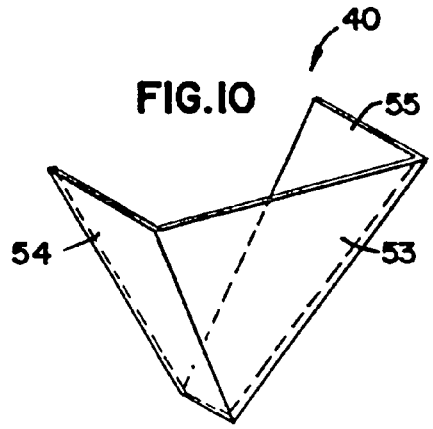
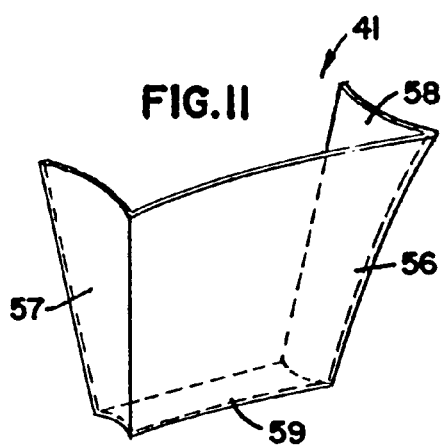
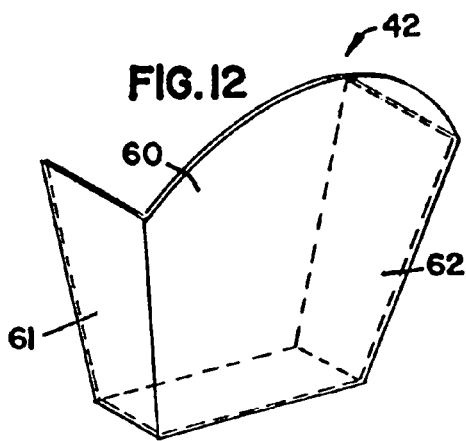
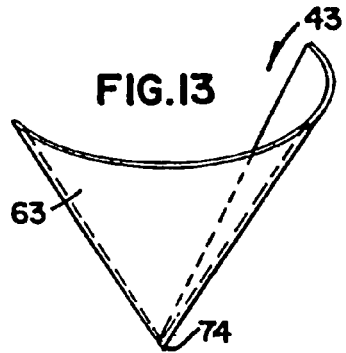
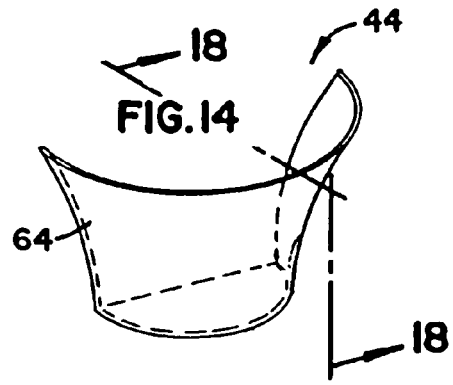

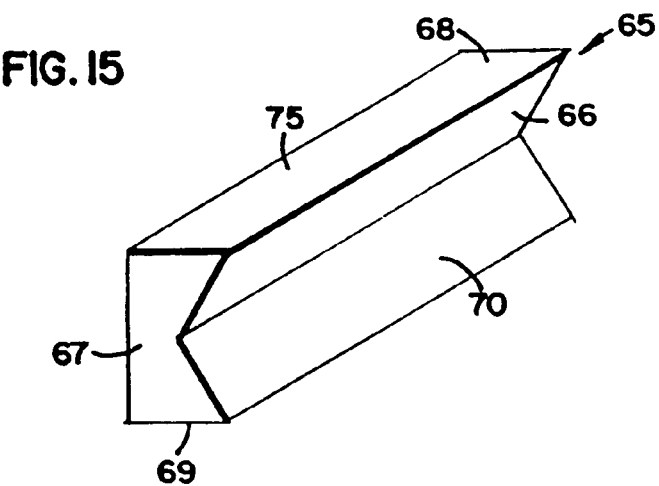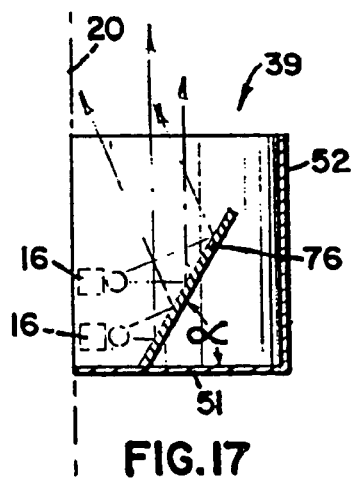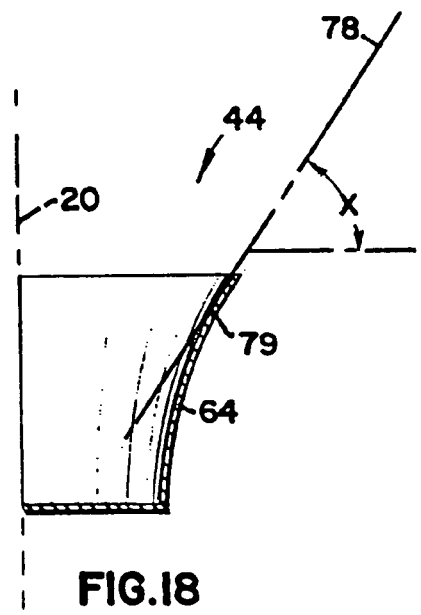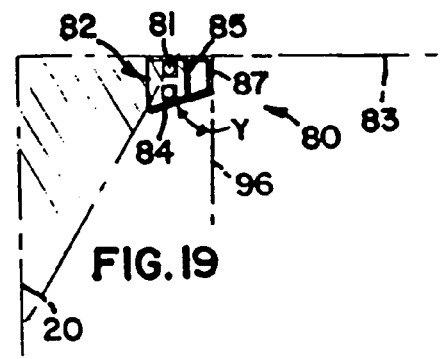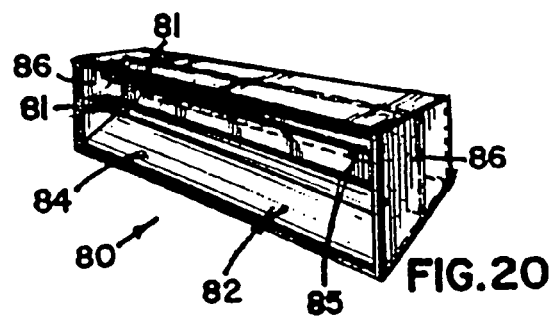

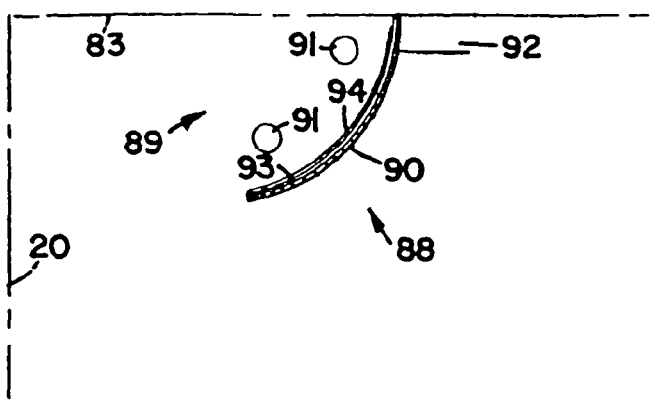
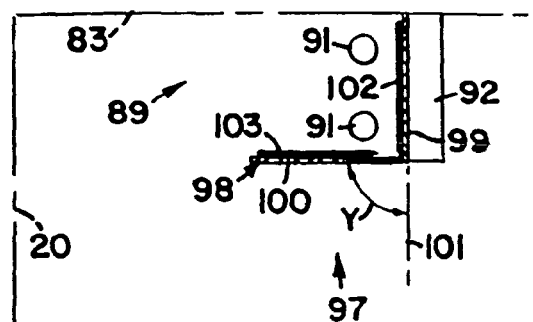
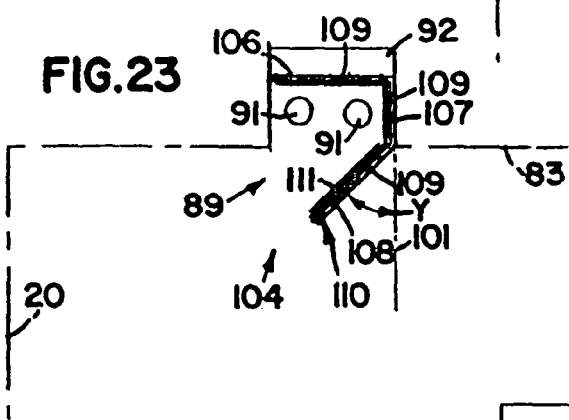
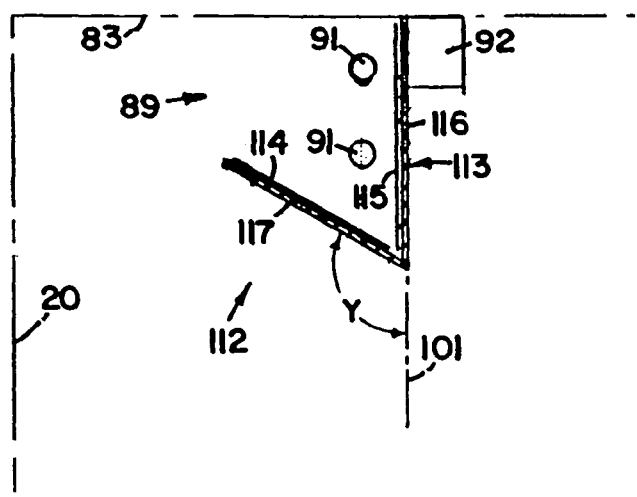

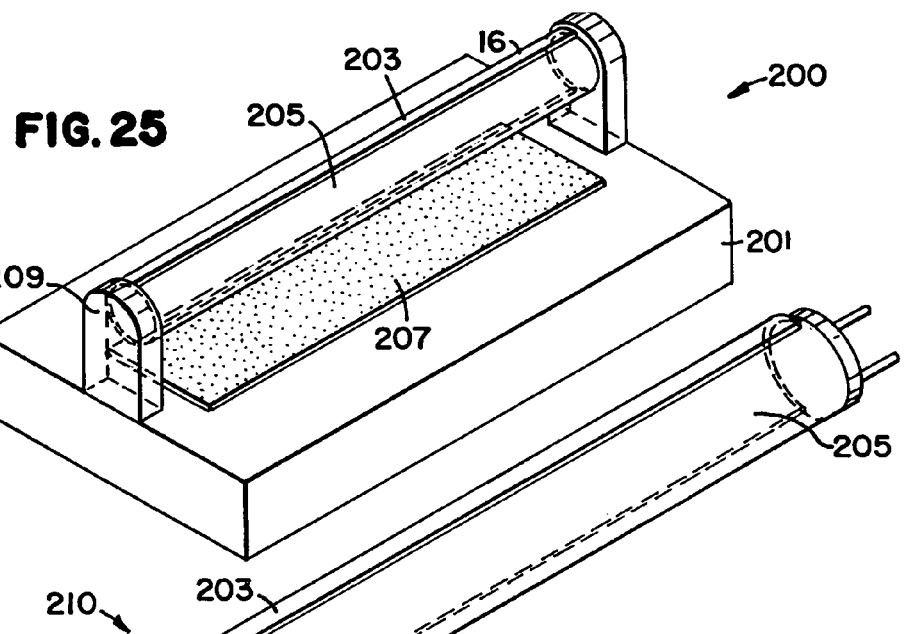
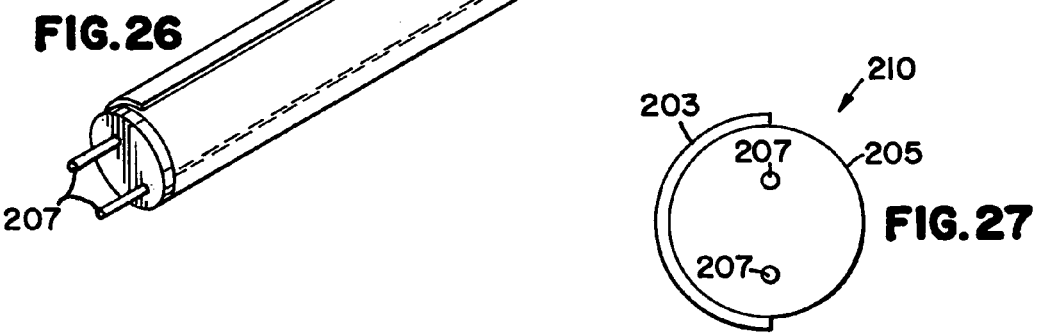
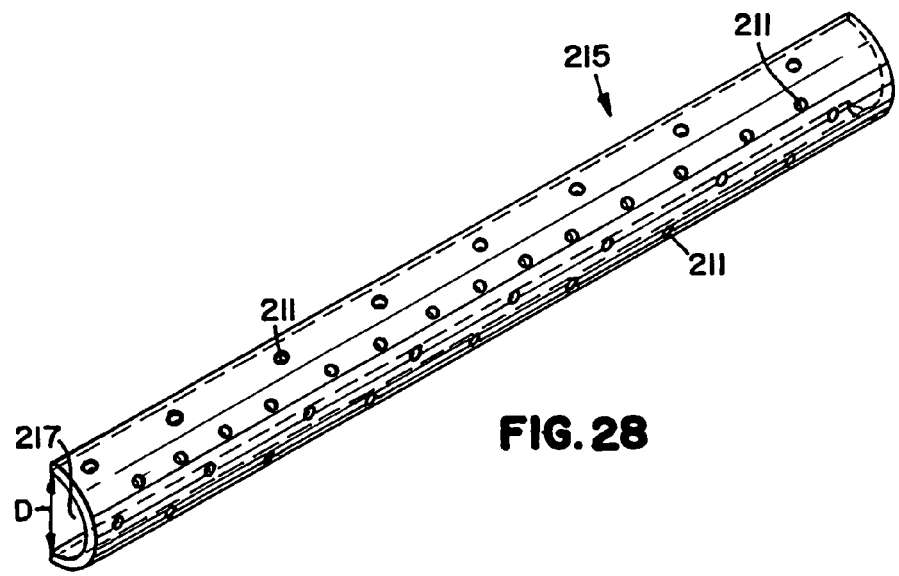

LIGHT TRAP FOR INSECTS

This application is a continuation-in-part of Ser. No. 09/604,488 filed Jun. 27, 2000; now U.S. Pat. No. 6,493,986 which is continuation of U.S. Ser. No. 09/250,932 filed Feb. 18, 1999, now abandoned; which is a continuation of U.S. Ser. No. 08/686,432 filed Jul. 26, 1996, now abandoned; which is a continuation of U.S. Ser. No. 08/342,904 filed Nov. 21, 1994, now abandoned; which is a continuation-in-part application of U.S. Ser. No. 08/000,264 filed Jan. 4, 1993, now U.S. Pat. No. 5,365,690, dated Nov. 22, 1994.

FIELD OF THE INVENTION

The invention relates to an illuminated trap adapted to attract flying insects and immobilize the insect with a lethal surface. The trap uses a source of insect attractant light directed to a projection surface in combination with a preferred enclosure or housing configuration to increase the capture rate.

BACKGROUND OF THE INVENTION

A number of flying insect traps using attractant light sources have been proposed in the prior art. However, the prior art traps have utilized a light source which is exposed and therefore directly viewed. The Insect-O-Cutor fly traps made by I-O-C use an exposed bulb with a high voltage electrocuting system. Pickens and Thimijan disclose exposed UV-emitting light sources and electrified grids for trapping and electrocuting flying insects.

Another trap system generally uses frontally or horizontally exposed ultraviolet black lights for attracting insects to the trap. In the trap the insect lands on an electric grid in the rear of the cabinet. The grid provides a low voltage pulse that causes the insect to fly down onto a nontoxic adhesive trapping board. The captured insect can then be disposed of with the removable adhesive sheet. Grothaus et al., U.S. Pat. No. 4,696,126, discloses an exposed bulb adhesive trap. Lazzeroni, Sr. et al., U.S. Design Pat. No. 325,954, discloses a generally front-facing, exposed bulb trap. Aiello et al., U.S. Pat. No. 4,959,923, is related to Lazzeroni, Sr. et al., U.S. Design Pat. No. 325,954. The Aiello device uses pulsed electricity to stun insects, coupled with an adhesive trap and an ultraviolet light source. Similarly, Gilbert insect light traps use exposed bulbs and generally front facing entry spaces for fly trapping purposes. Hollingsworth and Hartstack, Jr. disclose data relating to the efficiency of various components of exposed bulb fly traps.

Larkin, U.S. Pat. No. 4,949,501, and the ARP Venus Flylite system disclose the use of an attractant light source. The light source and its housing are hinged on a wall attachment means such that the unit is movable between two positions. In the first position or vertical mode, the light source is parallel to the vertical surface and is placed at an angle of 90 to the horizontal surface. In this so-called "invisible mode", used during business hours, the trap is designed to keep the operational components of the fly trap out of sight. When placed in the second position, the fly trap is in a "turbo" mode wherein the light source and housing are perpendicular to the vertical surface and horizontal to the floor (or at an angle greater than 90 to the vertical surface). This turbo position exposes the light directly to view, which is asserted to increase insect attraction.

White, U.S. Pat. No. 4,876,822, discloses a flying insect unit comprising a rectangular housing enclosing a light source, an optional top and an adhesive trapping surface. The housing components are either parallel to or perpendicular to the vertical mounting surface. The White unit is designed for attraction to and entry of the insects through a bottom opening.

In our work modeling light attractant fly traps, we have found that the geometry of these prior art light traps neither displays the attractant light to the maximum advantage, nor exhibits the best design for optimizing entry of the insects. Another difficulty with prior art designs is that they are unattractive and/or too large for mounting in many locations. In most situations, it is undesirable for people to realize that an insect trap is in operation, especially in restaurant settings. However, many of the prior art designs are so large and unattractive that the presence of the insect trap is noticed. Furthermore, it is often difficult for the user to find a convenient and unobtrusive location for the prior art insect traps, particularly when it is necessary to supply electric power to the trap.

The insect trap of the present invention is designed to address many of the difficulties present with prior insect trapping devices.

SUMMARY OF THE INVENTION

The present invention is a trap for insect pests, comprising a base, a source of insect attractant light, and an insect immobilization means. A method of using the insect trap is another aspect of the invention. The trap is mounted such that the insect attractant light radiated from the source cannot be directly viewed. In one configuration, the insect trap is mounted to a vertical, planar surface, such as a wall. In another configuration, the insect trap is mounted to a horizontal, planar surface such as a ceiling, floor or shelf. The surfaces provide a projection surface for receiving insect attractant light radiated from the source.

The trap's base may include a wall forming a housing the wall having an angled surface. The angled surface of the trap is 90, less than 90, or about 45-75, from the base surface.

The insect trap includes an insect immobilization means. In one embodiment, the immobilization means is positioned within the trap's housing, and the dead insects are captured within the housing. The immobilization surface is preferably a removable adhesive sheet. Alternatively, the immobilization means may be a pesticide, a mechanical trap, a liquid trap, or an electric grid.

In another embodiment, the insect immobilization means comprises an insecticide which is applied to a surface inside and/or outside the insect trap. The insects are attracted to the treated surface because of the trap's effective display of attractant light. With the latter embodiment, the insect contacts or ingests the insecticide and dies elsewhere at a later point in time.

Whereas prior art traps have sought to attract insects by directing light from the source into the surrounding environment, the insect trap of the present invention instead shields the light source from view and directs substantially all of the light to the projection surface. With the present invention, the radiated light is directed toward a nearby surface, which creates an illumination area upon the projection surface. This illumination area is aesthetically pleasing, yet effective in attracting and trapping insect pests. We have further found that a color contrast between the projection surface, and the exterior of the adjacent fly trap's housing, also serves to increase capture rates.

The light source can be a fluorescent lamp, an incandescent lamp, a laser, a light emitting diode, an array of such diodes and the like. A portion of the radiated light should have a wavelength in the range of 3500 Å to 4000 Å. This is commonly known as the near ultra violet range and is particularly attractive to flying insects. The source can be a tubular fluorescent lamp having a linear shape or a curved shape, a bulb shape or any shape in which lamps can be formed.

The light source can be partially covered to direct substantially all of the insect attractant light to the projection surface. The covering may be a coating or a shroud proximate the light source. The coating or shroud may be opaque or translucent. Partially covering the light source tends to increase the amount of light directed to the projection surface, and to minimize the contribution of reflected light from trap surfaces. The resulting light display effectively and efficiently attracts insects.

An advantage of the present invention is its effectiveness in capturing flying insects. Insects are of concern in any setting, but particularly in restaurants, cafeterias, and other settings in which food is present. The insect trap unobtrusively captures insects, without emitting any sound or odor. The enhanced capture rates are experienced even with the smaller-sized preferred embodiments of the insect trap. Although one skilled in the art would suspect that a smaller insect trap and correspondingly smaller entry opening would drastically reduce the capture rates, we have discovered that the capture rates for the smaller sized units are much higher than expected.

Another advantage of the present invention is that its design can be aesthetically pleasing. When mounted upon a wall, the insect trap having a housing and the associated illumination zone create an aesthetically pleasing appearance similar to a decorative wall sconce. When mounted upon the ceiling, the insect trap is essentially out of sight and not noticeable. The trap may be mounted on the ceiling and project an insect attractant light pattern on a wall. Likewise, the trap may be mounted on a wall to project an insect attractant light pattern on the ceiling. Since the mounting surface and projection surface may be the same or different surfaces, there is great flexibility in the placement of the trap. Indeed, the location of the trap can be chosen so that restaurant patrons and others are not aware of its actual purpose.

Yet another advantage of the present invention is its ease of use. The trap can be readily mounted to a wall, ceiling, or other suitable surface. The trap needs to be checked only occasionally for disposal of insects and replacement of the immobilization means. In one embodiment, the insect trap's housing is pivotally mounted upon the wall, ceiling, or other support surface. This feature facilitates substitution of the insect immobilization surface, replacement of burned-out light bulbs, and routine maintenance and cleaning of the apparatus.

These features, along with other advantages, will become subsequently apparent, based on the details of construction and operation as more fully described hereinafter, reference being made to the accompanying drawings, wherein like numerals refer to like parts throughout.

BRIEF DESCRIPTION OF THE DRAWINGS

FIG. 7 is a perspective view of a fourth embodiment of the insect trap of the present invention.

FIG. 8 is a perspective view of the fifth embodiment of the insect trap of the present invention.

FIG. 9 is a perspective view of the sixth embodiment of the insect trap of the present invention.

FIG. 10 is a perspective view of the seventh embodiment of the insect trap of the present invention.

FIG. 11 is a perspective view of the eighth embodiment of the insect trap of the present invention.

FIG. 12 is a perspective view of the ninth embodiment of the insect trap of the present invention.

FIG. 13 is a perspective view of the tenth embodiment of the insect trap of the present invention.

FIG. 14 is a perspective view of the eleventh embodiment of the insect trap of the present invention.

FIG. 15 is a perspective view of the twelfth embodiment of the insect trap of the present invention.

FIG. 17 is a cross-sectional view of the sixth embodiment, taken along line 17-17 of FIG. 9.

FIG. 18 is a cross-sectional view of the eleventh embodiment, taken along line 18-18 of FIG. 14.

FIG. 19 is a side view of the thirteenth embodiment of the insect trap of the present invention.

FIG. 20 is a perspective view of the thirteenth embodiment of the insect trap.

FIG. 21 is a cross-sectional, schematic view of a fourteenth embodiment of the insect trap.

FIG. 22 is a cross-sectional, schematic view of a fifteenth embodiment of the insect trap.

FIG. 23 is a cross-sectional, schematic view of a sixteenth embodiment of the insect trap.

FIG. 24 is a cross-sectional, schematic view of a seventeenth embodiment of the insect trap.

FIG. 25 is a perspective view of an eighteenth embodiment of the invention showing the cooperative association of a partly covered light source, a base and an immobilization surface.

FIG. 26 is a perspective view of the partly covered light source of FIG. 25.

FIG. 27 is an end elevation, cross sectional view of the light source shown in FIG. 26.

FIG. 28 is a perspective view of a shroud for providing a covering for a light source.

DETAILED DESCRIPTION OF THE PREFERRED EMBODIMENTS

Figure 1:
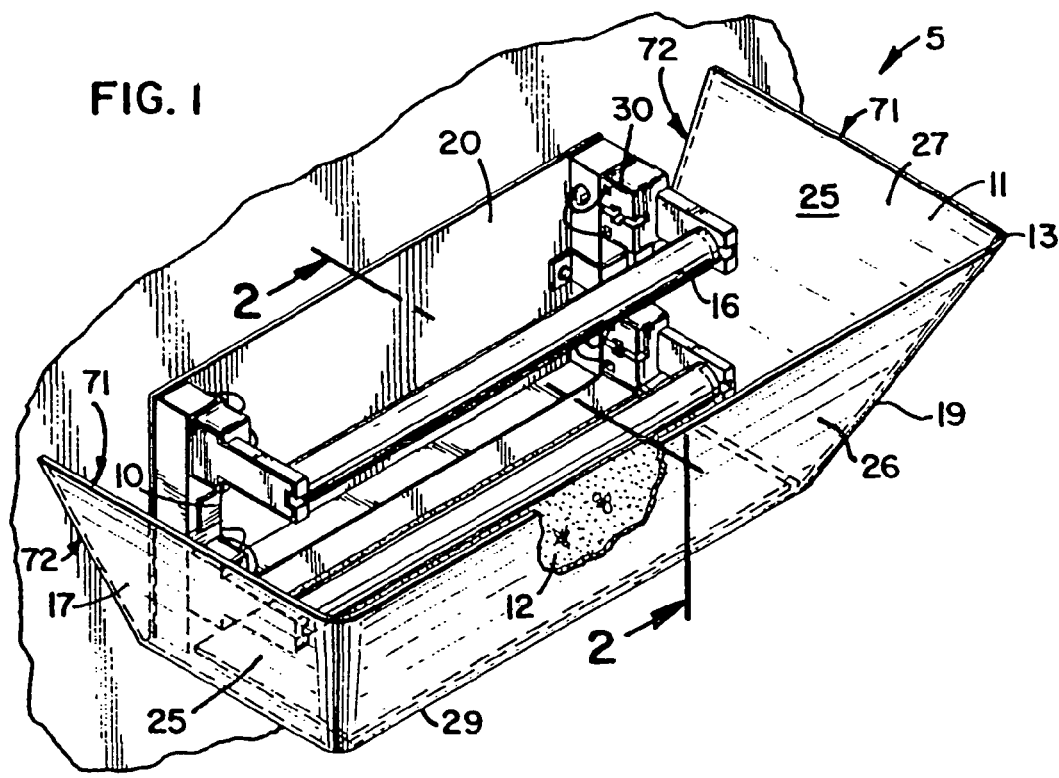
FIG. 1 is a perspective view of a first embodiment of the insect trap, showing the cooperative association of the light source, the housing, the reflective surface, the immobilization surface and the mounting means.
Figure 2:
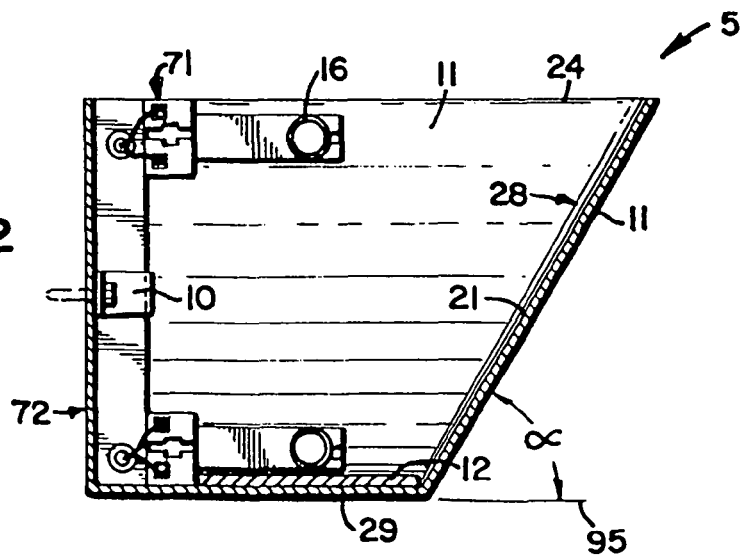
FIG. 2 is a side elevation, cross sectional view of the insect trap shown in FIG. 1.

The first embodiment of the insect trap is indicated generally at 5 in FIGS. 1 and 2. The insect trap 5 comprises a housing 11 operatively attached to a light source 16, an insect immobilization surface 12, and a mounting means 10. In the preferred embodiment, the insect trap 5 is mounted upon a vertical, planar surface, such as a wall 20. (The reference numeral 20 designates both the wall which is enclosed by the insect trap 5, and the wall surrounding the trap 5). The insect trap's housing 11 has a pair of opposite side walls 25, between which extends a front wall 26. The housing walls 25, 26 may have relatively small cutouts or openings therein (not shown).

The walls 25, 26 of the housing 11 define an upwardly directed opening 27. The opening 27 facilitates the walking or flying entry of insect pests. The insect trap 5 also includes a bottom wall 29. The bottom wall 29 is preferably horizontal, and it has a continuous surface which contains no apertures. In the preferred embodiment, the edges of the fly trap 5 adjacent to the vertical surface 20 are configured to match the vertical surface 20. The trap's housing 11 encloses the illumination source 16 on three sides, and the vertical surface 20 completes the enclosure. Alternatively, the trap's housing 11 could entirely enclose the light source 16, with the housing's rear wall (not shown) resting against the wall 20.

Light from the light source 16 radiates and reflects directly from the upwardly facing opening 27 of the trap 5 into a space generally above the trap 5 and onto wall surface 20 and ceiling surface (not shown in FIG. 1) above the trap 5. The wall and/or ceiling areas which receive the light are referred to herein as the projection surface. When the trap 5 is mounted on a vertical surface such as a wall 20, it can be mounted at virtually any height. Preferably, the insect trap 5 of the invention is installed in a location which is at or above eye level. The illumination source 16 is located near the top of the trap 5, inside the housing 11 and adjacent to the vertical surface 20.

The light source 16 useful in the fly trap 5 of the invention comprises a lamp radiating a portion of its light in the near ultraviolet wave length range of 3500 Å to 4000 Å. Such light sources are commonly incandescent or fluorescent electrically driven light sources that can emit a broad spectrum of wavelengths but are primarily optimized to emit ultraviolet light. For the purposes of this invention, ultraviolet light comprises radiation having wavelengths that have been found to attract flying insect species, between about 4000 Å and 400 Å. The light sources commonly provide from about 0.5 to about 100 watts of light output; preferably, the lights provide from about 0.5 to about 75 watts. The light source may have a variety of shapes without affecting the invention. For example, the light source may have a linear, bent or circular tubular shape, an arc lamp shape, a globular shape, and the like. Preferred light sources 16 are fluorescent lamps having from about one to about forty watts per tube unit. The trap 5 can use a single source or two or more sources horizontally or vertically arranged in the housing 11. The optimum light source needed to create an effective illumination zone for insect attractancy will depend upon the size and configuration of the trap housing and/or reflective surfaces, the wattage of the illumination source(s), and the degree to which the light is focused upon the projection surface.

As shown in FIGS. 1, 2, 25 and 29-32 the light source 16 may consist of one, two or multiple horizontal fluorescent lamps. Two or more lamps may be mounted vertically or horizontally in a parallel relationship. In the preferred embodiment, the light sources 16 are mounted so as to be below the upper edge 71 of the housing 11. The light source 16 is therefore substantially enclosed within the housing 11. In this manner, the insect trap 5 is mounted such that the light source 16 is not visible from eye level for people in the vicinity of the insect trap 5. The light source 16 can be directly viewed only by looking downwardly into the insect trap 5. The light fixture 30 for receiving the light source 16 can be designed for service or household power or for battery power using electronic conversion circuits adapted to drive the light source. The light fixture 30 can be mounted within the housing 11 with standard plug-in units. Preferably, the lamps 16 are fluorescent ultraviolet sources in sockets 17 that are commonly attached to household or service power.

The illumination source 16 can be mounted directly on the housing 11 or can be mounted on the vertical surface 20 surrounded by the housing 11. Preferably, the light source 16 is mounted on a fixture 30 attached to the wall 20. The fixture 30 can be positioned in any portion of the housing 11, but it preferably supports the light source 16 proximate the vertical surface 20. The light source 16 is thereby positioned optimally to direct a substantial proportion of the radiated energy onto the reflective surface and/or onto the projection surface.

The "reflective surface" can be any surface that reflects or throws back light. In the insect trap 5 shown in FIG. 1, the reflective surface is the interior surface of the front wall 26, the interior surface of the side walls 25, the planar surface 20, and the ceiling (not shown). The light is reflected from the trap's angled reflective surfaces and onto the vertical projection surface. The projection surface is the surface which receives the reflected and/or radiated light from the light source. The projection surface may be a wall, ceiling, floor, column, etc.

The reflective surface may be located at a variety of places with respect to the light's position. That is, the light source 16 can be above the highest projecting portion of the reflective surface, can be at approximately the same height as the reflective surface, or can be substantially below the high point of the reflective surface.

The insect trap's housing 11 can be manufactured in a variety of ways. The trap 5 can be molded as a single piece from thermoplastic materials or can be assembled from flat or substantially planar components that are attached by commonly available fasteners to form the angled side walls 25 and the flat bottom 29. Once the housing 11 is assembled, the mounting hardware 10 attached to the housing 11, and the appropriate immobilization surface and light source 16 can be installed. The insect trap 5 of the invention can be hardwired in place, can be empowered using electrical cords, or can have batteries installed at available locations in the housing. The housing 11 is preferably made from commonly available structural materials including thermoplastics such as polyethylene, polypropylene, polyethylene terephthalate; metallic materials such as aluminum, magnesium or related alloys; wood or wood products; reinforced thermoplastics or thermosetting materials; paperboard, pressed paperboard, corrugated paperboard, and others.

The first embodiment of the insect trap 5 also contains an insect immobilization means. For the purpose of this invention, the term "insect immobilization means" includes any device, surface or material that can cause the insect to die, or which prevents the insect from exiting the insect trap 5 after entry. Such immobilization means can include pesticides in the form of a surface, layer or trap; active and passive mechanical traps; liquid traps into which the flies become immersed; adhesive layers; pressure sensitive adhesive layers; high or low, D.C. or pulsed voltage electric grids; or other such means that can trap, immobilize, kill or dismember the insect pests.

A preferred immobilization means for the purpose of this invention comprises an adhesive surface 12. The most preferred surface comprises a highly tacky, pressure sensitive adhesive substance 12 which is attached to a cardboard base. One useful adhesive is a latex-based, plasticized tacky acrylic, ethylene-vinyl acetate or vinyl acetate based adhesive containing UV-inhibitors made by the H.B. Fuller Company of St. Paul, Minn. Another useful adhesive is the Tangletrap adhesive made by the Tanglefoot Company. Such an adhesive surface 12, installed within the housing 11 below the light source 16, is positioned such that when a flying insect enters through the top opening 27, the insect will come to rest directly on the adhesive surface 12. In the preferred embodiment, the pressure-sensitive, adhesive surface 12 is positioned upon the insect trap's bottom wall 29, below the light source 16 and opposite the upwardly facing opening 27. However, it is to be understood that the immobilization means 12 could be positioned at any other place within the insect trap 5 so long as the adhesive surface is accessible to insect pests. The immobilization surface and the immobilized insect pests should not be visible to persons in the vicinity of the insect trap 5 when the insect trap is in its normal operating position. The immobilization means could be placed on the mounting surface as long as it is substantially concealed from casual viewers. An electrical ballast (not shown) can be placed in the housing 11 beneath the adhesive 12.

A portion of the housing 11 in FIG. 1 is cut away for purposes of illustration, to show the dead insects upon the immobilization means 12. In the preferred embodiment, the adhesive sheet 12 is removable and disposable, and a fresh sheet 12 is installed within the insect trap 5 at appropriate intervals.

The immobilization surface 12 preferably extends across a portion of the bottom 29 or across the entire area of the bottom of the light trap 5. The immobilization surface also may be located on the walls 25, 26 of the housing 11 and/or on the wall surface 20. In the preferred embodiment, the immobilization surface is a sheet of pressure-sensitive adhesive 12. The adhesive board is changed periodically, as needed. Clear or pigmented white adhesives can be used to cooperate with the color of the reflecting surfaces of the angled housing walls 25, 26 to aid in directing reflected light onto the vertical surface 20. The adhesive surface 12 could be fluted rather than flat, so as to increase the available surface area for immobilizing the insects.

The trap 5 of this invention may include an optional insect attractant chemical. Insect attractant chemicals are typically organic material that are at least somewhat volatile and are products arising from typical insect food sources or are a pheromone or a mixtures of pheromones. In the preferred embodiment, an insect attractant chemical is incorporated into the adhesive which is utilized on the adhesive strip 12. The chemical is preferably an oil-based food odorant or a pheromone.

The insect trap 5 may also utilize an effective amount of an insecticide. A variety of volatile and non-volatile insecticides and formulated insecticide compositions are known to be effective against flying insects, and most can be used. However, the preferred insecticides for use with this invention are nonvolatile formulated insecticide compositions that kill insect pests after contact. Such nonvolatile pesticide compositions are not released into the environment surrounding the fly trap 5. Such materials include pyrethroid and organophosphate insecticide compositions. The insecticide may be sprayed within the insect trap 5, and/or on the nearby projection surface. That is, the insect trap 5 could project light onto a wall or other projection surface, with that surface having an insecticide applied thereon. After coming into contact with the insecticide, we have found that some of the insects would thereafter fly within the trap housing 11 to die, while other insects would contact or ingest the insecticide, fly around, and expire elsewhere.

The upwardly facing opening 27 of the insect trap 5 can invite misuse in the form of materials or objects being thrown into the opening. In order to protect the trap 5 from such problems, a barrier to such misuse which does not prevent the entry of insects, and which does not interfere with the direct or reflected radiation of light from the trap, can be installed on the upwardly facing opening 27. Such a barrier must substantially maximize the open area of the upwardly facing opening 27 and provide a minimal entry barrier. The grid or screen (not shown) should have openings large enough to permit entry of insects but small enough to exclude objects that are thrown or otherwise directed into the upwardly facing opening. Such a screen or grid can be made from a variety of materials including transparent or opaque materials. Such materials include metallic wires, synthetic or naturally occurring fiber threads, thermoplastic grids, expanded metal, wire screens, etc. In the preferred embodiment, the grid is constructed to have openings which are at least approximately four square inches in area.

Preferably, the trap 5 is mounted directly on a vertical surface 20 or ceiling surface, as depicted in the various Drawings. Alternatively, the trap 5 could be positioned adjacent a wall 20. For example, the trap 5 could be placed upon a shelf or table which is close enough to the projection surface to create an illumination zone. Additionally, the trap could be mounted upon a portable support stand, so that insect trap apparatus would look similar to a conventional floor lamp.

Correct placement of the trap with respect to the projection surface increases insect capture through direct radiation of light and reflection of light onto the projection surface. The insect trap 5 is placed adjacent the projection surface at a distance such that light from the trap is radiated onto and/or reflected onto the vertical surface 20 and/or the ceiling surface. The first embodiment of the trap 5 is preferably wall mounted and placed within 30-50 inches of the ceiling surface. The interior of the trap 5 may be white or another light color, in order to increase the attractant light display that is produced.

In a preferred embodiment, an optional, additional shiny reflection means 28 can be utilized so as to optimize the attractant illumination created by the insect trap 5. In the first embodiment, the shiny reflection layer 28 preferably extends across the interior of the front wall 26 of the trap's housing 11, as shown in FIG. 2. The reflection layer is thus at the same angle as the angle of the front wall 26.

The shiny reflection layer 28 can be made from metallic surfaces such as aluminum foil, metallized polyester brightwhite reflected panels, silvered glass mirrors or other related reflective surfaces. The shiny reflection layer 28 may be positioned anywhere within the interior of the insect trap 5, such as along the interior of the side walls 25 and/or front wall 26, and/or along the planar surface 20. In addition, the shiny reflection layer 28 could be positioned on the bottom wall 29 of the housing 11. In the embodiment illustrated in FIGS. 1 and 2, the shiny reflection layer 28 is positioned upon the interior surfaces of the front wall 26, and it comprises an aluminum foil or metallized polyester surface.

The shiny reflection layer may also be a separate surface that is installed within the insect trap at an angle other than the angle of the housing's wall. In other words, the front wall 26 of the housing 11 could be at any arbitrary angle with respect to other housing components as long as the shiny reflection layer's internal surface is positioned at the desired angle. This feature is illustrated in FIGS. 9 and 17, and is described below.

The color of the trap's housing 11 contrasts with the color of the adjacent vertical surface 20, so as to aid in increasing capture rates. In the preferred embodiment, the exterior walls of the housing 11 are a tan color or darker, and the surrounding wall 20 is white. Alternatively, the insect trap 5 could be a white color, with the adjacent wall 20 being a tan color or darker.

The trap's mounting means can be any suitable mechanical system that can support the weight of the trap 5 and that can maintain the upwardly open entryway 27. The trap 5 can be fixed in place using a variety of mounting hardware such as screws, bolts, nails, clips, flanges, etc., or can be temporarily placed in the proper position using Velcro fasteners, pressure sensitive adhesive pads, rubber feet, etc. As an example, the mounting means 10 illustrated in FIGS. 1 and 2 comprises a bracket and screw device. The housing 11 can contain a flange, tab or hook that attaches to vertical surface 20 by means of fasteners such as screws, nails, permanent structural adhesives, Velcro fasteners, etc. Additionally, the fly trap 5 can be suspended from the ceiling so as to rest against the vertical surface 20 via suspending straps, cables, chains, etc. Alternatively, the attachment means can comprise an aperture in the housing 11 that permits the fly trap 5 to hang on cooperative hooks, protrusions or other suspension points on the vertical surface 20. The important characteristic of the mounting means is that the trap 5 should be securely mounted on the vertical surface 20 such that the vertical surface 20 receives a display of direct, diffused and/or reflective light from the trap 5 in order to attract insects and increase capture rates.

In the preferred embodiment, the base surface 29 is a separate piece from the rest of the housing 11. The front and side walls 26, 25 form an integral shroud 27. The shroud 27 has rear edges 72 which rest against the wall 20 when the insect trap 5 is in operation. The base surface 29 is mounted to the wall 20 in a permanent horizontal position. The rest of the housing 11 is pivotally mounted upon the bracket 30, so that the shroud 27 can be moved upwardly into a position wherein the upper edges 71 of the housing 11 rest against the wall 20. In this position the interior components of the insect trap 5 are exposed. This facilitates replacement of the adhesive surface 12, and replacement of the light sources 16.

The reflecting surfaces of the insect trap 5 should have a certain preferred geometry. The housings in the prior art have reflecting surfaces which have some capacity for insect attractancy, but the prior art has primarily relied upon direct exposure to a light bulb to attract insects. We have found that direct exposure of the light is not necessary for insect attractancy, and that an improved geometry of the housing can substantially and surprisingly increase the attractancy of flying insect pests.

The first, second, and third embodiments of the trap all have the same configuration, depicted in FIGS. 1 and 2. However, each of the embodiments has a different size, as specified below. The first, second and third embodiments, the insect trap 5 has an upwardly facing opening 27 and walls 25, 26 positioned at an angle $\alpha$ to the base surface of less than 90°.

The angle is measured with respect to an extension line 95 from the base surface 29; thus, when an angle is said to be with respect to the base surface, it is intended to mean with respect to the base surface extension line which extends outwardly from the wall 20 and parallel to the base surface 29. The angle $\alpha$ is shown in FIG. 2. The attractancy of such insect traps increases when the angle $\alpha$ is less than 90°, and the attractancy peaks at an angle $\alpha$ of 45-75°, most preferably about 60° between the reflecting surface and the base surface extension line 95 of the insect trap 5.

The first, second and third embodiments of the trap each has planar housing walls 25, 26. However, the housing walls can be planar, curved or have other decorative shapes. The angled surface can be the housing's front wall, and/or its side walls. Such a slanted or curved reflective surface reflects and displays the light from the light source 16 on the vertical mounting surface 20 and/or on the ceiling in a highly effective pattern that can substantially increase attractancy and capture rates. The curvature and/or slant to the housing's wall(s) results in an increased capture rate. This increase in attractancy results partially from the increased size of the entry opening 27, and also because the angle of the housing's reflective surface facilitates the optimum display of attractant light. The sloped or curved housing walls also tend to prevent insects from simply walking around the outside of the trap.

Figure 3:
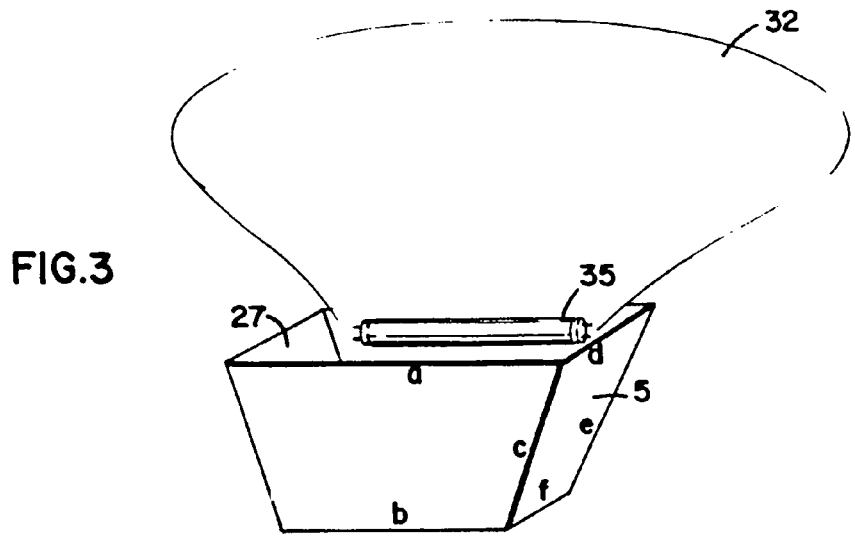
FIG. 3 is a perspective, schematic view of the insect trap and associated light display.

FIGS. 3, 4, 5, and 6 are schematic views of the illumination zones created upon the wall by the insect trap. In these drawings, the wall 20 is the projection surface. FIG. 3 is a schematic view of an insect trap, showing the illuminated light footprint 32 which is created. We have found that insects are attracted to the illumination zone 32 and that many insects initially alight upon the illumination zone before entering the insect trap. We have also found that a larger proportion of insects alight on the bright zone 36 than on the remainder of the illumination zone 32.

Figure 4:
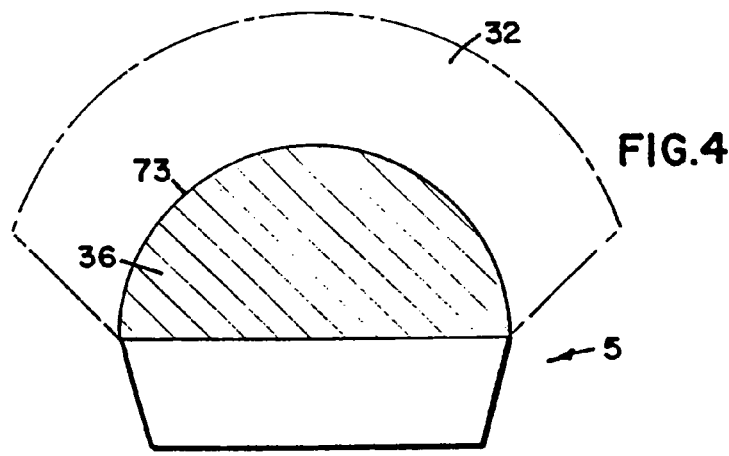
FIG. 4 is a schematic view illustrating two illumination zones for a first, large-sized embodiment of the insect trap.
Figure 5:
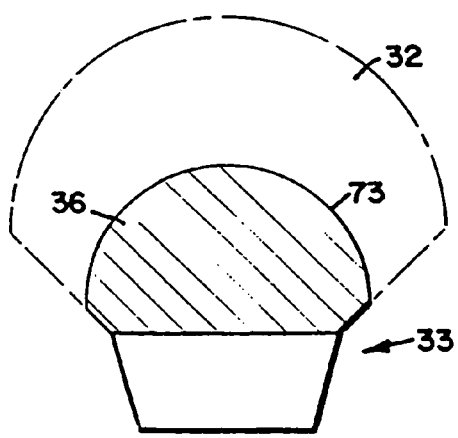
FIG. 5 is a schematic view illustrating two illumination zones for a second, medium-sized embodiment of the insect trap.
Figure 6:
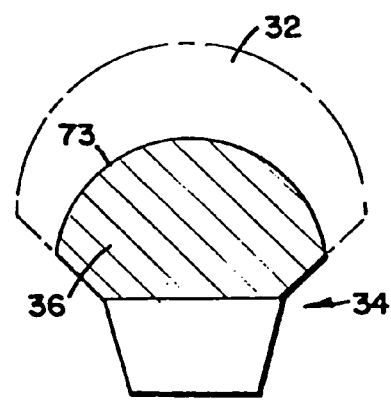
FIG. 6 is a schematic view illustrating two illumination zones for a third, small-sized embodiment of the insect trap.
Figure 16A:
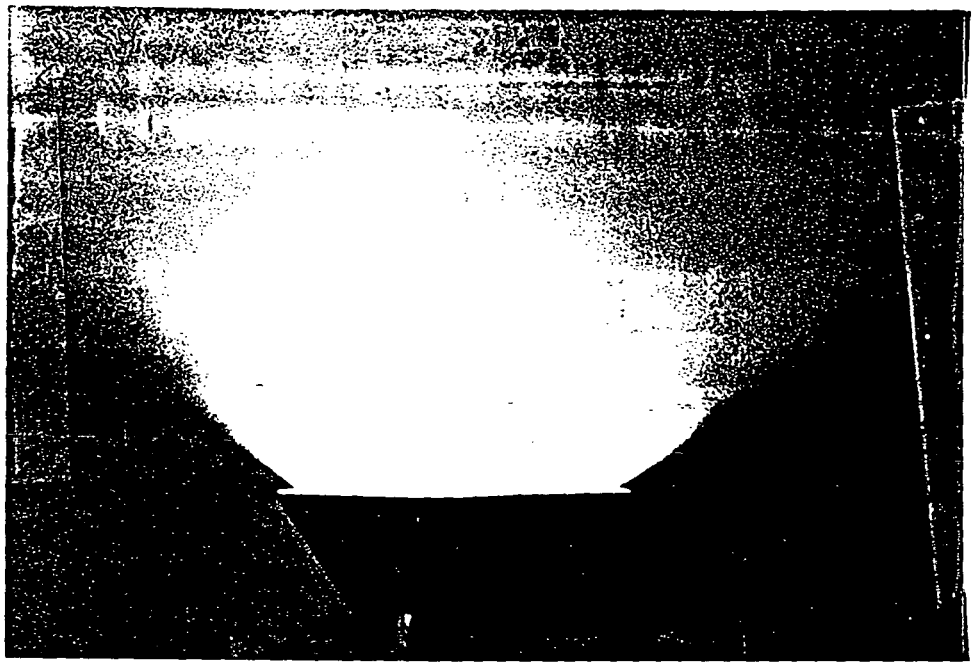
FIGS. 16A and 16B are photographs of the second embodiment of the Insect Trap, depicting the illumination zone produced by a insect trap of the present invention.
Figure 16B:
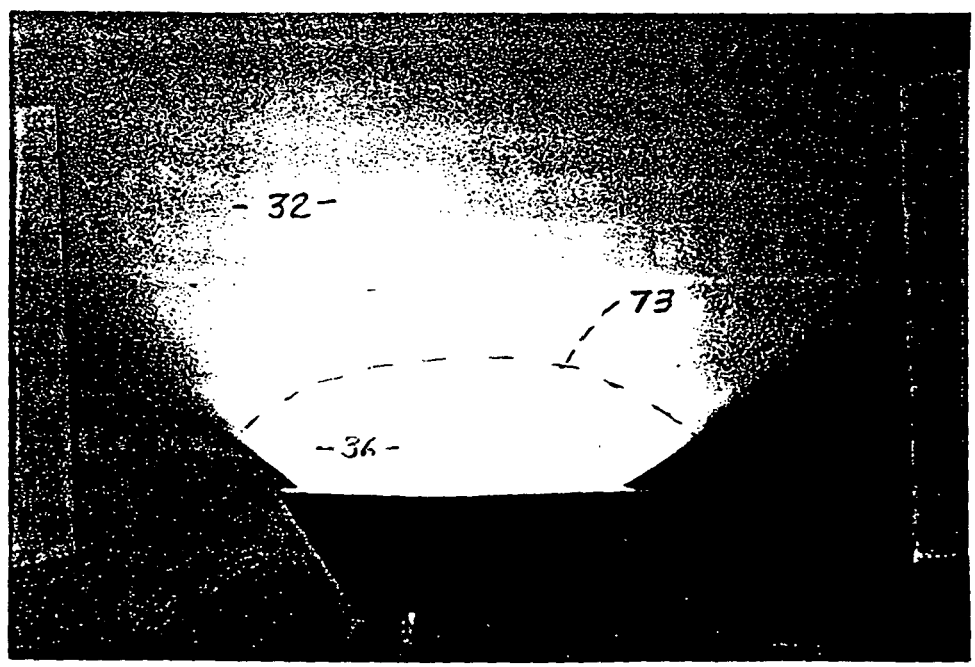

FIG. 3 is intended to represent any of the three embodiments 5, 33 or 34. FIG. 4 illustrates the first, large embodiment 5; FIG. 5 illustrates the second, mid-sized embodiment 33; and FIG. 6 illustrates the third, small embodiment 34. Each insect trap 5, 33, 34 creates an illumination zone 32 on the wall 20 or projection surface. The illumination zone is generally above the trap. (The trap 5 may also create an illumination zone on the ceiling, but this is not illustrated in FIGS. 3-6 for purposes of clarification.) Part of the illumination zone 32 is discernible as being a "bright zone" 36. The bright zone 36 is the area on the wall where the light is most pronounced and noticeable. Although FIGS. 4, 5 and 6 illustrate a clear boundary 73 defining the bright zone 36, the boundary of the bright zone is subjectively defined, because the light is brightest near the lamp 16 and then diminishes gradually until no further light or illumination zone 32 can be discerned. The appearance of the bright zone 36 and the illumination zone 32 is more accurately depicted in the photographs of FIGS. 16A and 16B. FIG. 16A is a photograph of the second embodiment of the insect trap and its illumination zone. FIG. 16B shows the same view, but it is marked up to show the subjective boundary 73 of the bright zone 36. As is shown in FIGS. 4, 5, and 6, a reduction in the insect trap's size results in a reduced size of the illumination zone 32.

The following Table 1 shows the dimensions of the three traps illustrated in FIGS. 4-6. The first embodiment is shown in FIG. 4; the second embodiment is shown in FIG. 5; and the third embodiment is shown in FIG. 6.

TABLE 1

| Edge | Size of First Embodiment | Dimension of Second Embodiment | Dimension of Third Embodiment |
|---|---|---|---|
| a | 25.25 in. | 19.10 in. | 9.69 in. |
| b | 15.25 in. | 11.53 in. | 5.82 in. |
| c | 12.00 in. | 9.07 in. | 4.50 in. |
| d | 10.25 in. | 7.76 in. | 3.91 in. |
| e | 10.50 in. | 7.94 in. | 4.01 in. |
| f | 4.25 in. | 3.21 in. | 1.62 in. |
| Area of entry opening (ad) | 258.8 in.$^2$ | 148.2 in.$^2$ | 37.9 in.$^2$ |

The smaller sized insect traps 33 and 34 are advantageous because they can be positioned in a wider variety of locations as compared to the first embodiment. Also, the smaller size makes these traps 33, 34 relatively inconspicuous, which does not detract from the room's interior design features. Moreover, the smaller size allows for a direct plug-in to an electrical outlet, thereby eliminating the need for a cord or allowing the use of a short cord. In the preferred embodiments 33, 34, one or two nine-watt fluorescent bulbs may be utilized as the light source 16. The bulbs are approximately five inches in length, thereby allowing the insect trap 34 to be relatively compact.

The housing 11 of the trap can take a variety of shapes. The insect trap can be generally circular, oval, ellipsoidal, can be an extended shape having parallel sides and either rectilinear or curved ends, the trap can be triangular, square or rectangular, hexagonal, octagonal, etc. However, each trap configuration preferably has one or more angled reflective surfaces for optimum reflection of light onto the projection surface.

FIGS. 7-15 illustrate alternative embodiments of wall-mounted insect traps of the present invention. These alternative embodiments employ various housing designs. Each housing is intended to be mounted to a wall or other vertical, planar surface. Each of the traps in FIGS. 7-15 also includes a light source and mounting means, although these elements are not illustrated for purposes of clarification.

FIG. 7 illustrates a fourth embodiment 37 of the insect's trap. The insect trap 37 has a rounded shape which is similar to a quarter of a sphere. The interior, reflective surface is concave when viewed from the wall 20. The insect trap 37 has a substantially horizontal bottom surface 47. The angle of curvature of the insect trap 37 (with respect to the horizontal) varies gradually between 0° at its bottom end to approximately 90° at the upper edge of the housing. Because the insect trap's housing is curved, the angle of curvature may be determined with reference to a tangent line taken along some point of the housing, with respect to a horizontal extension line like the extension line 95 illustrated in FIG. 2.

FIG. 8 illustrates a fifth embodiment 38 of the present invention. The insect trap 38 has a plurality of housing sections 48, 49, 50. Each housing section has a somewhat rounded shape which extends around to enclose the light source laterally. The interior reflective surface of each section 48, 49, 50 is concave when viewed from the wall 20. The bottom section 50 has a bottom wall (not shown) which is substantially horizontal. In the preferred embodiment, each of the sections 48, 49, 50 is slanted outwardly from the wall, so that the angle of each section 48, 49, 50 with respect to the horizontal base is less than 90°.

FIGS. 9 and 17 illustrate a sixth embodiment 39 of the insect trap. The insect trap 39 is shaped like half of a cylinder, and the insect trap 39 has a horizontal bottom surface 51. With the design of insect trap 39, the angle of the housing 52 with respect to the horizontal base surface is approximately 90°. FIGS. 9 and 17 illustrate the use of a separate, planar reflective surface 76 which is at an angle α with respect to the horizontal base surface. The reflective surface 76 may have an optional shiny layer thereon (not shown). The reflective surface 76 may have a curved configuration and/or may consist of several angled surfaces.

A seventh embodiment 40 of the insect trap is illustrated in FIG. 10. The insect trap 40 has a front, triangular shaped wall 53, on either side of which is a side wall 54, 55. The side walls 54, 55 are slanted in a "V" configuration. The angle of the front wall 53, with respect to the horizontal is 90° or less. With this design, the immobilization means may consist of a V-shaped adhesive sheet positioned proximate the center of the trap 40. Alternatively, a separate, horizontal surface (not shown) for support of the adhesive sheet may be provided.

An eighth embodiment 41 of the insect trap is illustrated in FIG. 11. The insect trap 41 has a front wall 56 which curves outwardly from the vertical surface upon which the insect trap 41 is mounted. The insect trap 41 has a pair of side walls 57, 58 which also curve outwardly, and a base 59. The interior, reflective surfaces of the walls 56, 57, 58 are convex as viewed from the wall 20. With the insect trap 41, the tangent curvature of the front wall 56 with respect to the horizontal base surface 59 ranges from approximately 90° at the bottom end of the front wall 56 to approximately 60° proximate the upper edge of the front wall 56.

The ninth embodiment 42 of the insect trap shown in FIG. 12 is somewhat similar to the embodiment illustrated in FIG. 11. However, the insect trap 42 features a front wall 60 and side wall 61, 62 which have a continuous, planar surface, rather than convex surface. Each of the walls 60, 61, 62 slants outwardly with respect to the planar surface 20 upon which the insect trap 42 is mounted. In the preferred embodiment, the angle of the surfaces 60, 61, 62 is less than 90° with respect to the horizontal base. The upper edge of the front wall 60 preferably has a curved or domed configuration as shown in the drawing.

FIG. 13 illustrates a tenth embodiment 43 of the present invention. With this design, the insect trap's housing 63 is shaped like half of a cone. The bottom of the insect trap 43 terminates in a point 74. With this embodiment, the angle of the conical housing wall with respect to the horizontal is preferably approximately 45-75°.

FIGS. 14 and 18 illustrate an eleventh embodiment of the present invention, which is somewhat similar to the sixth embodiment illustrated in FIG. 9. The housing 64 of the insect trap 44 curves gradually outward proximate the upper portion of the insect trap 44. The inner reflective surface of the housing 64 is convex proximate its upper edge. As illustrated in FIG. 18, the front wall 64 has a gradual curvature, which may be measured by creating a tangent line 78 at an arbitrary point 79 along the front wall 64. Preferably, the angles of the tangent lines proximate the upper portion of the wall 64 are less than 90° with respect to the horizontal, and more preferably approximately 30°-75° with respect to the horizontal. The tangent line's angle is the angle between the tangent line and the horizontal, and this angle is designated as x in FIG. 18.

FIG. 15 illustrates a twelfth embodiment 65 of the present invention, which features a front wall 70 having a pair of slanted, inverted panels, and which has a pair of side walls 67, 68. The insect trap 65 has an upwardly directed opening 75, but may also have an optional bottom opening 69. With the insect trap 65, the angle of the front wall's upper panel 66 with respect to the horizontal is approximately 60°.

For the embodiments illustrated in FIGS. 7-18, it is to be understood that they have all the features described in detail with respect to the first embodiment of FIG. 1. That is, each of the embodiments illustrated in FIG. 7-18 has a light source, mounting means, optional shiny layer, immobilization means, optional insect attractant chemical, optional insecticide, etc. Although each of the embodiments shown in FIG. 7-18 is mounted directly to a vertical surface 20, it is to be understood that each of the traps could be mounted so as to be spaced away from the projection surface. In addition, each of the insect traps could be mounted upon a portable or stationery support member. Each insect trap could also be mounted proximate the floor, preferably behind another structure so that people would not be looking downwardly into the trap's upper opening.

The insect trap of the present invention could also be mounted upon a ceiling. FIGS. 19-24 show exemplary embodiments of an insect trap which is mounted to the ceiling 83, rather than to the wall 20. Referring to FIGS. 19-20, the thirteenth embodiment of the insect trap 80 has a housing with side walls 86, a back wall 87 and bottom wall 84. The insect trap 80 may also have an upper wall, or the ceiling itself 83 may form the upper wall of the insect trap's enclosure. The walls 86, 84 form a lateral opening 82, which allows for the walking or flying entry of insect pests.

The insect trap 80 has one or more light sources 84 which are contained within the insect trap's housing. The light source 84 directs illumination from the opening 82, thereby creating an illumination zone on the ceiling 83 and/or on the wall 20, as shown in FIG. 17. The illumination zone is effective in attracting insects into the trap 80. As noted above, the insects tend to alight initially on the illumination zone. Further, we have found that flies alight on both the wall illumination zone and the ceiling illumination zone. The insect trap 80 contains insect immobilization means, preferably an adhesive sheet which is mounted to a vertical support member 85. Preferably, the insect trap 80 is mounted within 50 inches of the wall surface 20. The insect trap 80 is held on the ceiling by suitable mounting means (not shown). Preferably, the bottom wall 84 is angled downwardly, as illustrated in FIG. 17. The angle y of the wall 84 is preferably less than 90° from the base surface, and more preferably approximately 30°-75° from the base surface. This angle is designated as y. When stating that the angle y is with respect to the base surface, the angle y is with respect to the base surface extension line 96. The extension line 96 is a vertical line if the base surface is vertical. The insect trap 80 may contain an optional shiny reflective layer, insecticide, a chemical insect attractant, and the other features described above with respect to the other embodiments. Furthermore, the size and shape of the ceiling-mounted trap 80 can be varied in many different ways, as illustrated above with respect to the wall-mounted units.

A fourteenth embodiment of the insect trap is illustrated in FIG. 21. The insect trap 88 is mounted upon the ceiling 83 such that there is a lateral opening 89 which faces the wall 20. The housing 90 of the insect trap 88 has a curved configuration like a quarter of a sphere, similar to the fourth, wall-mounted embodiment. The light source for the insect trap 88 is a pair of ultraviolet lamps 91, which are mounted suitably to the housing 90 or ceiling 83. A ballast compartment 92 is provided. The interior of the housing 88 has a removable, shiny reflection layer 93, which has an adhesive coating 94.

A fifteenth embodiment of the insect trap is illustrated in FIG. 22. The insect trap 97 has a lateral opening 89, which is formed by a housing 98. The housing 98 has a vertical base surface 99, bounded by a bottom wall 100 and a pair of side walls (not shown). The rectangular configuration of the housing 98 forms an angle y of 90 degrees, i.e., the angle of the base surface extension line 101 with respect to the bottom wall 100. The interior of the bottom wall 100 supports a shiny reflection means 103. The vertical base surface 99 has an immobilization means thereon, preferably an adhesive sheet 102.

FIG. 23 illustrates a sixteenth embodiment of the present invention. A portion of the insect trap 104 is mounted in a rectangular recess 105 formed in the ceiling 83. The upper portion of the recess 105 accommodates the trap's ballast compartment 92. Also within the recess 105 are a pair of light sources 91. The housing 110 of the insect trap 104 has a horizontal upper wall 106, a vertical base surface 107, and an angled bottom wall 108. The insect trap 104 is also bounded by a pair of side walls (not shown). A shiny reflective layer 109 is applied to all of the housing's interior surfaces. The interior of the bottom wall 108 has a suitable immobilization means, such as an adhesive sheet 111. The angle y of the bottom wall 111 with respect to the base surface 107 is preferably less than 90 degrees, and most preferably approximately 45-75 degrees.

The seventeenth embodiment of the present invention is illustrated in FIG. 24. The insect trap 112 has a housing 113 which forms a lateral opening 89. The housing has a vertical base surface 116, an angled bottom surface 117, and a pair of side walls (not shown). In this embodiment, the angle y of the bottom surface with respect to the base surface is greater than 90 degrees. The interior of the base surface 116 has a shiny refection layer 115, and the interior of the bottom wall 117 has a suitable immobilization means, such as an adhesive sheet 114.

As with the wall-mounted insect traps depicted above, the illustrated ceiling mounted embodiments are exemplary only, and changes can be made as to the configuration and placement of the insect trap's various components.

In an eighteenth embodiment of the invention as illustrated in FIG. 25, substantially all of the light from the light source 16 is directed to the projection surface with no substantial contribution from reflected light to form the insect attractant light pattern similar to that shown in FIGS. 3-6, 16A and 16B. Referring to FIG. 25, the embodiment 200 in its simplest form is a light source 16 mounted in an electrical socket 209 which is mounted on a base 201. A portion of the surface 203 of the light source 16 is covered or masked with an opaque or translucent material that restricts the emission of light from the light source 16 to an unmasked surface 205. The trap 200 is placed proximate a projection surface, such as a wall or a ceiling, and the light source 16 is oriented so that light is radiated directly from the light source 16 to the projection surface to create an insect attractant light pattern. An insect immobilization means 207 is positioned on the base 201 proximate the light source 16. The location of the immobilization means 207 is selected for optimum trapping efficiency and may be varied based on actual catch rates. The immobilization means may be affixed to the projection surface so that the insect attractant light pattern forms on the immobilization means.

The embodiment shown in FIG. 25 does not require a housing. The illumination area formed on the projection surface is from light radiated directly from the lamp 16. However, a housing may be desirable for aesthetic reasons if the trap is placed in an area accessible to the public.

The light source 16 shown in FIGS. 25, 26 and 27 is a linear, tubular fluorescent lamp 210 emitting a portion of its light in the range of 4000 Å to 400 Å or in the range 4000 Å-3000 Å. The lamp 210 can be any convenient length to conform to the size of the trap. A length of 18 inches is typically used. The lamp 210 has two end pins 207 to connect the lamp 210 to the electrical socket 209.

The surface of the lamp 210 is partially enclosed by a covering 203 along its length forming an uncovered surface 205. The uncovered surface 205 provides a means to direct substantially all of the light radiated from the lamp 210 to a projection surface. The covering 203 may be a coating such as the polymer sold under the trade name SURLYN available from DuPont Corp. The polymer coating may contain an opacifying agent such as a pigment. The coating may have some transparency to light, but such light does not have sufficient intensity to form an effective insect attractant light pattern on a projection surface.

The covering 203 may also be in the form of a shroud 215 as shown in FIG. 28. The shroud 215 has an elongated, cylindrical shape with an opening or slot 217 forming an arc. The opening 217 runs the length of the shroud 215 resulting in a cross section perpendicular to the length having a crescent shape. The diameter D of the shroud 215 proximates the diameter of the lamp 210 so that the lamp 210 fits within the shroud 215. The length of the shroud 215 proximates the length of the lamp 210. When the shroud 215 is fitted to the lamp 210, a portion of the surface 203 of the lamp 210 is covered and a portion of the surface 205 is uncovered. Substantially all of the light is radiated from the lamp 210 through the uncovered portion of the surface 205. The arc 217 formed by the shroud 215 proximates at least about 50% of the circumference of the lamp 210.

The shroud 215 may be made from a flexible material such as plastic or metal. If the arc formed by the opening 217 in the shroud 215 has diameter D slightly less than the diameter of the lamp 210, the shroud 215 will form a compression fit with the lamp 210. This permits the shroud 215 to be rotatably mounted on the lamp 210 to vary the position of the insect attractant light pattern on the projection surface. Varying the position of the insect attractant light pattern may be desirable for aesthetic or trapping efficiency reasons. The compression fit holds the shroud 215 in the desired position on the lamp 210. The shroud 215 may optionally have perforations 211 to help dissipate heat from the lamp 210. The size and location of the perforations 211 is not critical. However, they should not allow significant leakage of light away from the uncovered surface 205 of the lamp 210.

Figure 29:
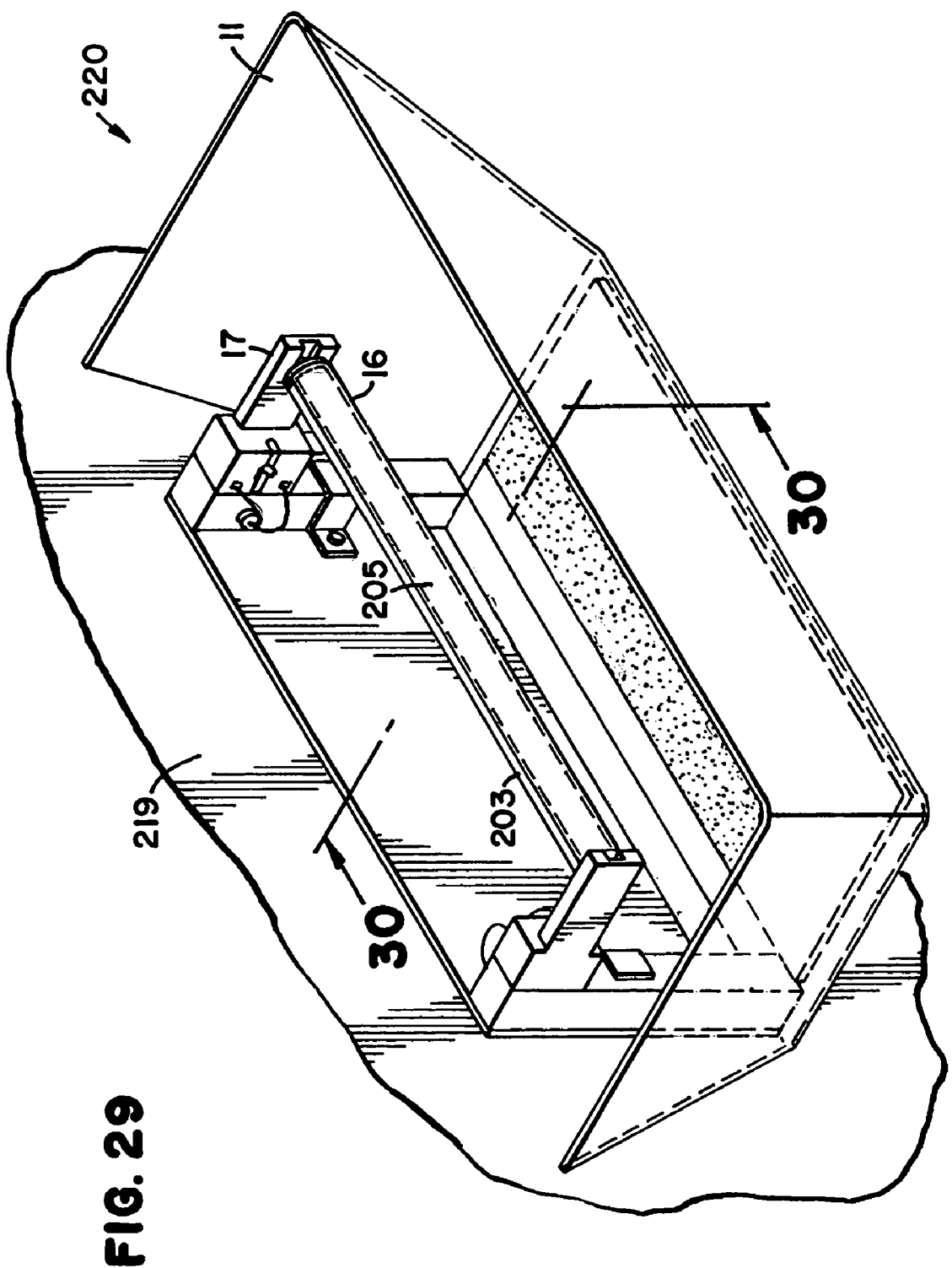
FIG. 29 is a perspective view of a nineteenth embodiment of the invention showing the cooperative association of a partly covered light source, a housing and a projection surface.
Figure 30:
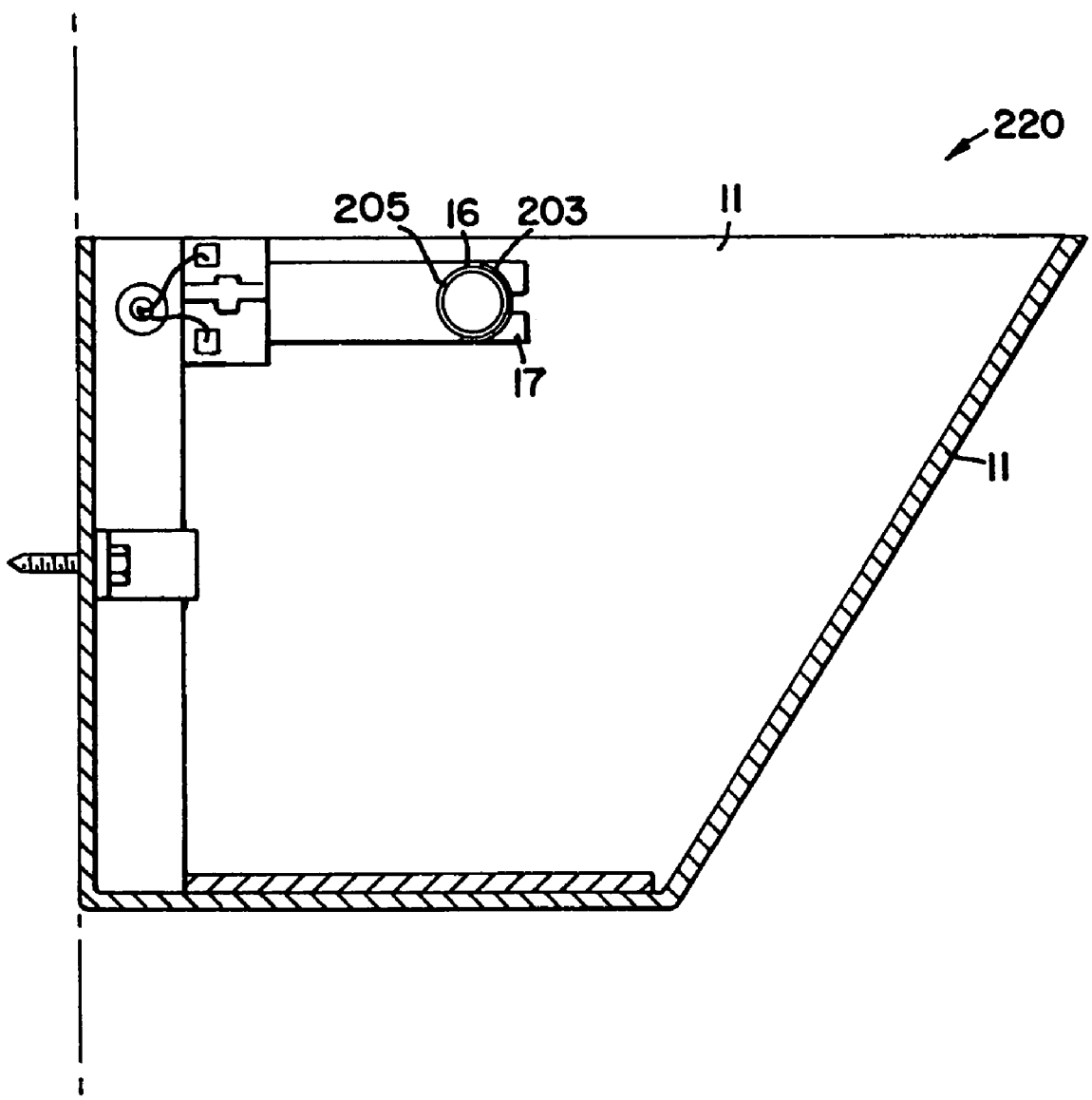
FIG. 30 is a side elevation, cross sectional view of the embodiment shown in FIG. 29.

A nineteenth embodiment 220 of the invention is shown in FIGS. 29 and 30. This embodiment is similar to the embodiment shown in FIGS. 1 and 2 except that the embodiment in FIGS. 29 and 30 has one light source 16 mounted near the opening of the housing 11. The light source 16 is a lamp 210 shown in FIGS. 26 and 27 having a covered area 203 and an uncovered area 205. The lamp 210 can be positioned to direct substantially all light away from the housing 11 to a projection surface 219.

Figure 31:
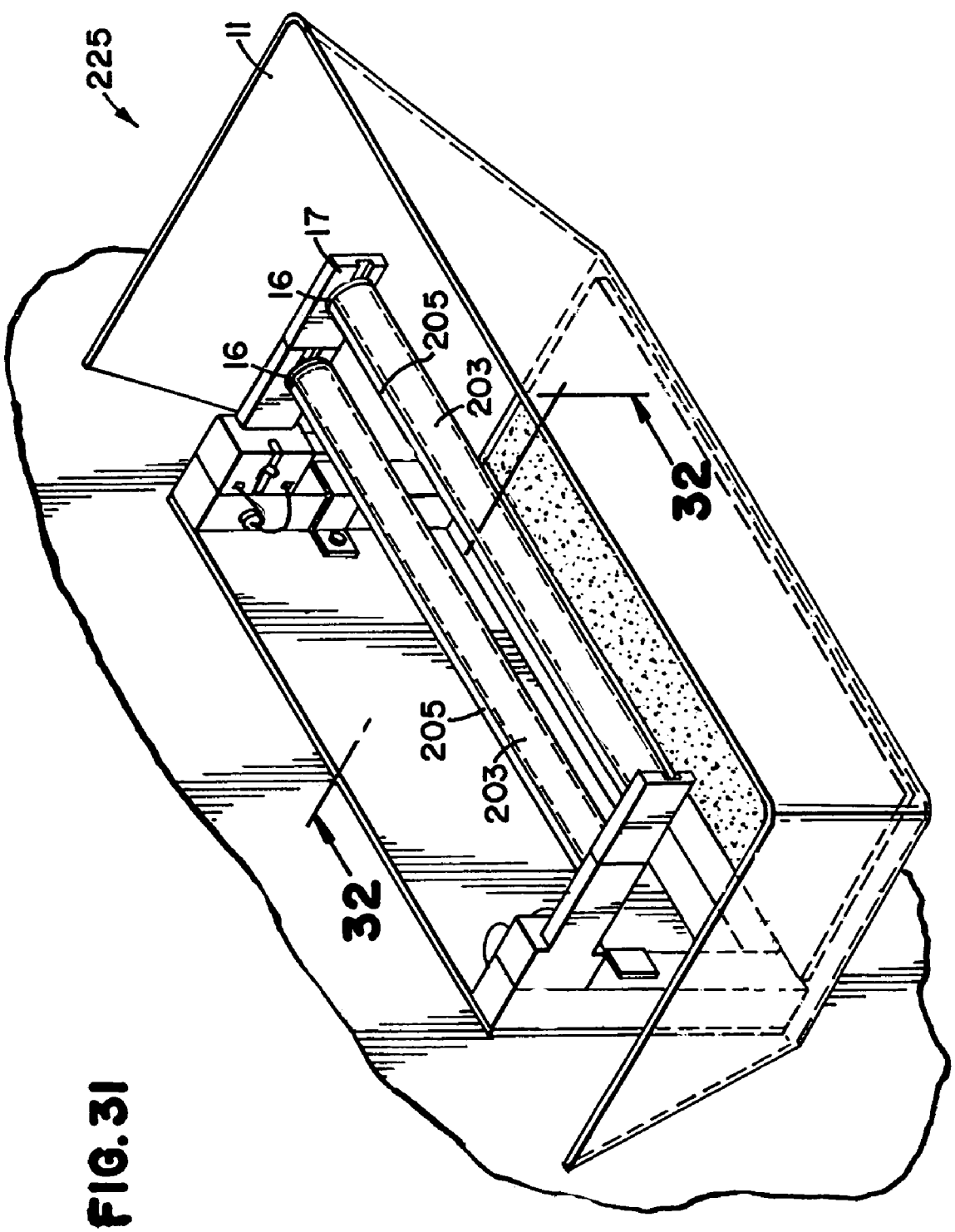
FIG. 31 is a perspective view of a twentieth embodiment of the invention showing the cooperative association of two partly covered light sources, a housing and a projection surface.
Figure 32:
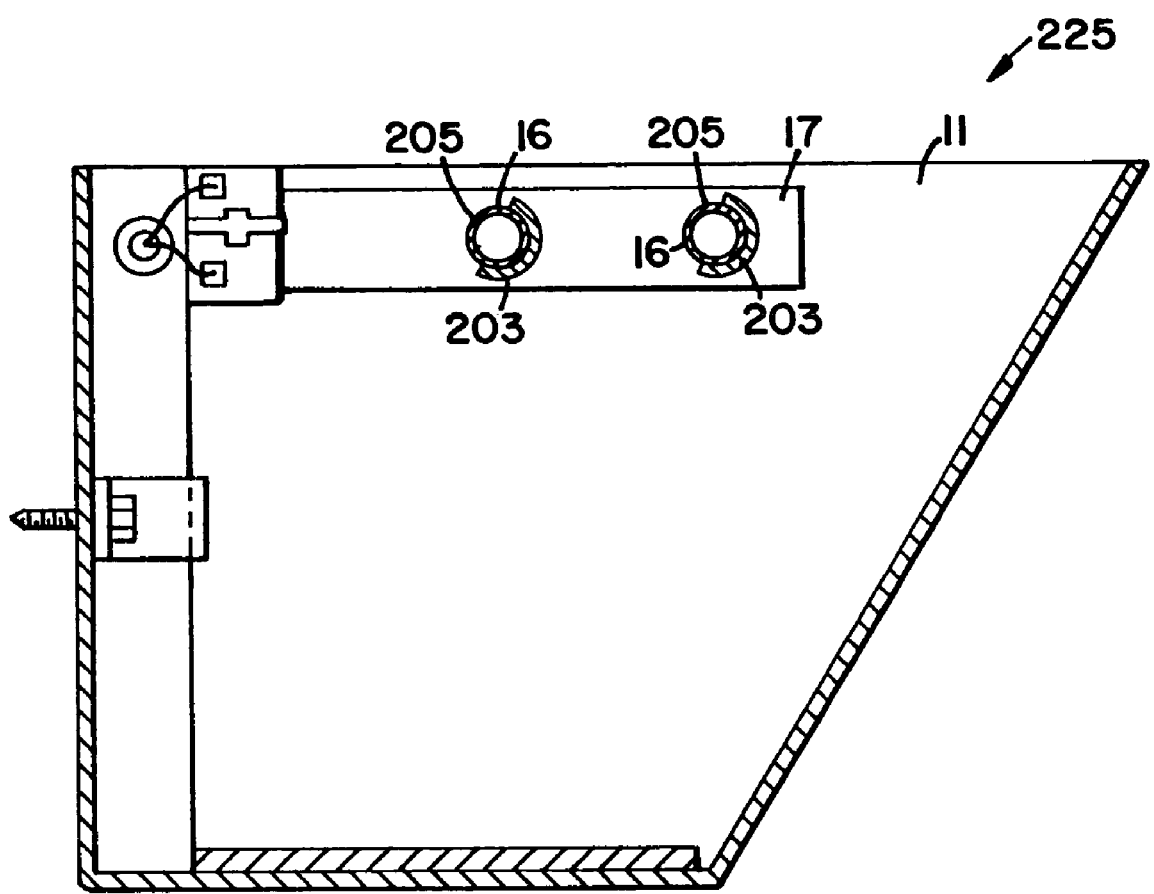
FIG. 32 is a side elevation, cross sectional view of the embodiment shown in FIG. 31.

A twentieth embodiment 225 is shown in FIGS. 31 and 32. This embodiment 225 is similar to the embodiment 220 shown in FIGS. 29 and 30 except that the embodiment 225 in FIGS. 31 and 32 has two light sources 16 mounted near the opening of the housing 11. The light sources 16 are lamps 210 shown in FIGS. 26 and 27. The lamps 210 can be positioned to direct substantially all light away from the housing 11 to a projection surface 219. The invention is not limited to embodiments having one or two light sources, and may have more than two light sources.

Figure 33:
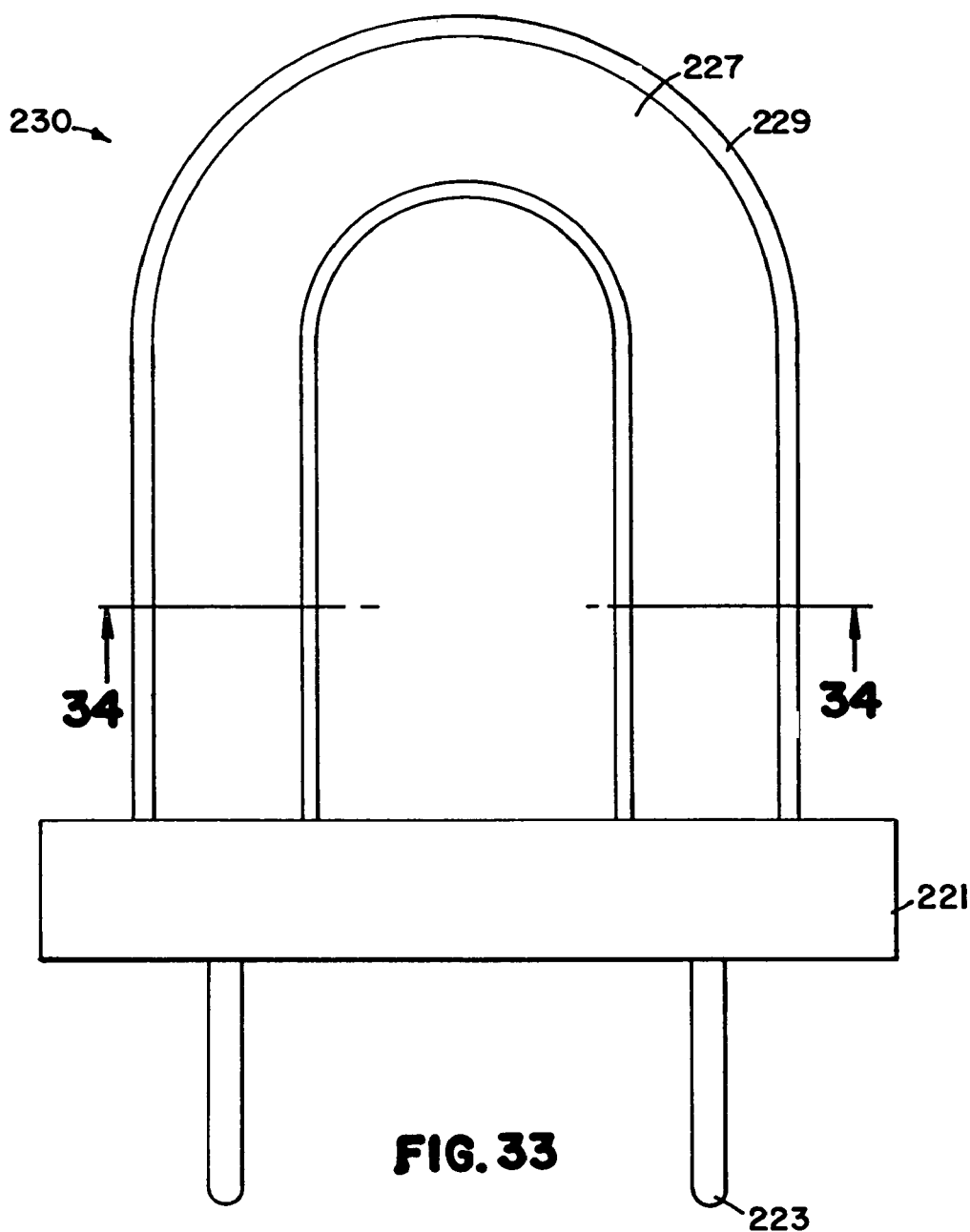
FIG. 33 is perspective view of a partly covered U-shaped light source.
Figure 34:
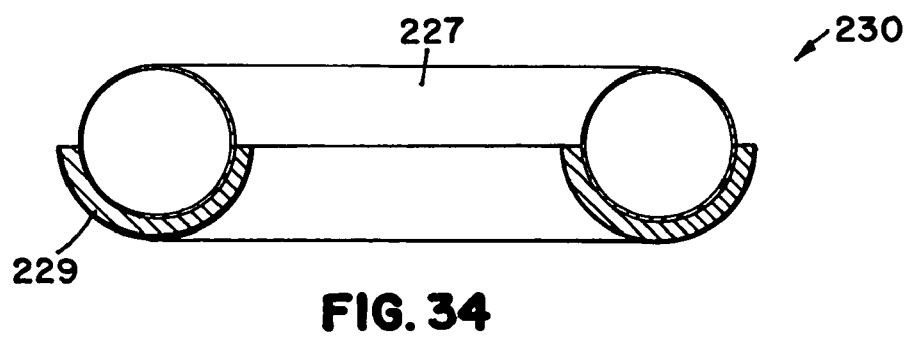
FIG. 34 is an end elevation, cross sectional view of the light source shown in FIG. 33.

Embodiments 200, 220 and 225 are shown with linear, tubular light sources 16. However, the invention is not limited to a light source having a particular shape. FIGS. 33 and 34 show a U-shaped fluorescent lamp 230 having a base 221, end pins 223 for electrical connection and a covering 229 along its length forming an uncovered surface 227. The lamp 230 may be mounted in embodiments 200, 220 and 225 in place of lamp 210. It is understood that an appropriate electrical fixture 30 for receiving a U-shaped lamp is provided. Lamps and brackets are commercially available from numerous sources.

Experimental Section

In the development of the insect traps of the invention, a substantial body of work was conducted to discover the insect trap geometry that would provide peak capture rates for flying insects. We found that insect pests enter the trap either by alighting on the wall and/or the ceiling, and then entering the trap by walking; or by flying directly into the insect trap and alighting on the first available surface. We have found that using either mode of entry, the most likely direction of entry will be downward vertically into an upwardly facing opening, or horizontally into a lateral opening. Accordingly, we have found that it is highly desirable to avoid placing any substantial barrier in the flying insect trap that would prevent such entry. The light source should not be substantially obscured by any portion of the housing. Any grid or screen installed in the housing should have minimal barrier properties.

We have found that an effective insect attractant light pattern can be displayed on a projection surface by directing to the surface substantially all of the light from a lamp. We have also found that the use of a contrasting color, generally a darker color, for the exterior of the trap housing, as compared to the color of the vertical surface, increases capture rates.

Capture rate experiments were performed to demonstrate the advantages of displaying an insect attractant light pattern proximate the trap. The results are summarized in Tables 2 to 6. These experiments were performed using an insect attractant light pattern from a combination of light directly from the light source and a diffused display of reflective light. An insect attractant light pattern from directing substantially all light from the light source according to the eighteenth and nineteenth embodiment of the invention is expected to demonstrate similar results.

In conducting capture rate experiments, the fly traps of the invention are installed in an appropriate location in a room having white walls and ceiling, 50% relative humidity, a temperature of 80° F., insect food, competing fluorescent lights, and a density of approximately one fly per each 10 cubic feet of room space. This density equals 160 flies being released into the room at the outset of each experiment. The fly density was optimized to reduce statistical noise in experimental results. The mean data represent the mean number of flies captured per each one half hour. A prototype trap was installed in the experimental room in order to determine the impact on capture rates resulting from trap modification including the opening of the trap facing in a variety of directions. Traps were installed with openings upwardly directed, downwardly directed and horizontally directed. Statistically significant differences between the upwardly "open" configuration and all other configurations which are called "closed" were found (Table 2). The "closed" configuration indicates a trap having a bottom or side (horizontally directed) opening. The use of an upwardly facing opening had a strong increase on mean capture rates and resulted in greater than a 40% increase in fly capture rates when a trap having an upwardly facing opening was installed on a vertical surface. The "control" experiment in the following tables comprises a flat bottom housing for supporting the adhesive, but having no side walls to surround the exposed bulbs.

TABLE 2

| Top Entry Configuration | Replicates | Mean* | Std. Dev. |
|---|---|---|---|
| Open | 12 | 23.083 | 6.067 |
| Closed | 12 | 16.417 | 5.017 |
| Control | 4 | 22.000 | 4.163 |

*Mean fly capture rate (number of flies captured per half hour)

Table 3 displays mean capture rates measured in flies per half hour and shows that a contrasting dark color significantly increases the capture rates for the fly trap installations. In these experiments, the walls and ceilings were white, and the trap's housing was either white or tan. These data show that significantly more insects (greater than 34%) are attracted to a contrasting color in the housing exterior.

TABLE 3

| Trap Color | Replicates | Mean | Std. Dev. |
|---|---|---|---|
| White | 27 | 19.4 | 5.4 |
| Tan | 12 | 26.0 | 5.8 |

An experiment was also conducted to determine the effect on catch rates of different sizes of traps. Three different sized insect traps were tested, having the linear dimensions a-f shown in Table 1 above. The first embodiment is the large insect trap 5, the second embodiment is the mid-sized trap 33, and the third embodiment is the small trap 34. A single, nine watt UV bulb 35 was utilized as the light source in each trap, and the bulb 35 was horizontally mounted beneath the upper edge of the trap's housing. The room had normal illumination provided by ceiling fixtures. Each insect trap was wall-mounted. The experiment was conducted nine times to arrive at the below insect catch rates. The size of the illumination zone was determined by marking the apparent illumination boundary on the wall, and then measuring the illuminated wall area. Table 1 sets forth the dimensions for the first, second and third embodiments of the insect traps.

TABLE 4

| Area/Catch | First Embodiment | Second Embodiment | Third Embodiment |
|---|---|---|---|
| Area of entry opening (ad) | 258.8 in.$^2$ | 148.2 in.$^2$ | 37.9 in.$^2$ |
| Area of full illumination zone | 1593 in.$^2$ | 821 in.$^2$ | 339 in.$^2$ |
| Flies caught per 1/2 hour | 13.00 (9) | 16.44 (9) | 10.70 (9) |

The general expectation would be a significant reduction in capture rates for the smaller units. More specifically, one would expect that as the area of the entry opening decreases, and as the area of the illumination zone decreases, the capture rate would decrease proportionately. One would also expect that as the size of the illumination zone decreases, the capture rate would decrease proportionately. However, our experiments have shown that the smaller sized units' capture rates are higher than expected. Table 4.

The improvement in the catch rate for the second embodiment was 121% (i.e., the actual catch rate as compared to the expected catch rate based upon the relative sizes of the entry openings) and 145% (i.e. the actual catch rate as compared to the expected catch rate based upon the relative sizes of the illumination zones).

The improvement in the catch rate for the third embodiment was 466% (i.e., the actual rate as compared to the expected catch rate based upon the relative sizes of the entry openings) and 282% (i.e., the actual catch rate as compared to the expected catch rate based upon the relative sizes of the illumination zones). To summarize, the smaller-sized traps 33, 34 showed a reduced catch rate as opposed to the large trap 5, but the catch rate for the smaller units 33, 34 was significantly higher than expected.

As discussed above, a smaller insect trap is desirable for reasons of aesthetics and convenience of placement. The above data shows that the smaller units, even the third embodiment having an entry opening of only 38 square inches, effectively capture a large number of insects. Accordingly, a preferred embodiment of the present invention would have an entry opening of less than approximately 175 square inches.

An experiment was also conducted to determine the relative effectiveness of a wall-mounted insect trap and a ceiling-mounted insect trap. Table 5. For this experiment, the first embodiment of the insect's trap was utilized, being mounted first on a vertical wall, and then being mounted upon a horizontal ceiling. Two twenty-five watt UV bulbs were utilized as the light source in the trap, and the bulb was horizontally mounted within each trap's housing. The room had normal illumination provided by ceiling fixtures. The experiment was conducted with only one trap mounted in the room at a time. The experiment was conducted two times for each unit. To begin the experiment, 160 flies were released into the room (i.e., one fly per ten cubic feet). The immobilization means utilized in each unit was an adhesive sheet: a horizontal adhesive sheet in the wall-mounted unit, and a vertical sheet in the ceiling-mounted unit.

TABLE 5

| Embodiment | Average number of flies caught |
|---|---|
| Wall-mounted trap | 122.5 |
| Ceiling-mounted trap | 137.0 |

These data illustrate that the wall-mounted trap and ceiling-mounted trap are approximately equal in their effectiveness in catching insects. The difference in the average number of flies caught by each unit was not considered to be a statistically significant.

While the above specification, data and figures provide a basis for understanding the advantages of using the disclosed geometry in illuminated insect traps, many embodiments of the invention can be made without departing from the spirit or scope of the disclosure herein. For that reason, the invention resides in the claims hereinafter appended.

I claim:

1. A trap for insect pests comprising:
   (a) a bottom wall and a housing, wherein the housing comprises a front wall and side walls, and wherein the front wall and the side walls define an upwardly directed opening when the trap is mounted on a vertical surface;
   (b) a light source provided below an upper edge of the housing and enclosed within the housing, wherein the light source provides insect attractant light, and the light source including a light source surface;
   (c) a light source covering that covers at least a portion of the light source surface such that a portion of the light source surface is uncovered, the insect attractant light is directed through the upwardly directed opening to a projection surface outside the trap and above the trap when the trap is mounted on a vertical surface, and there is not an effective insect attracting emission of light from any portion of the trap except the upwardly facing opening;

(d) an insect immobilization surface within the trap, wherein the insect immobilization surface comprises a removable adhesive sheet; and (e) wherein the insect pests enter the trap only through the upwardly directed opening.

2. The trap of claim 1 wherein the light source is a lamp.

3. The trap of claim 2 wherein the lamp is one or two fluorescent lamps.

4. The trap of claim 2 wherein the lamp is an incandescent lamp.

5. The trap of claim 1 wherein the light source is a light emitting diode.

6. The trap of claim 1 wherein the light source is an array of light emitting diodes.

7. The trap of claim 1 wherein the light source emits radiation in the range 3500 Å to 4000 Å.

8. The trap of claim 1 wherein the light source covering is a coating.

9. The trap of claim 8 wherein the coating comprises a polymeric coating.

10. The trap of claim 9 wherein the polymeric coating comprises a pigment.

11. The trap of claim 8 wherein the coating is opaque.

12. The trap of claim 8 wherein the coating is translucent.

13. The trap of claim 1 wherein the light source covering comprises a shroud.

14. The trap of claim 13 wherein the shroud is flexible.

15. The trap of claim 13 wherein the shroud comprises plastic or metal.

16. The trap of claim 13 wherein the shroud has an elongated shape and a crescent shaped cross section.

17. The trap of claim 13 wherein the shroud is rotatably mounted on the light source.

18. The trap of claim 17 wherein the shroud forms a compression fit with the light source.

19. The trap of claim 18 wherein the shroud forms a cover for a portion of the surface of the light source.

20. The trap of claim 1 wherein the light forms an insect attractant light pattern.

21. The trap of claim 1 wherein the insect immobilization surface comprises a lethal surface.

22. The trap of claim 1 wherein the trap comprises an insect attractant chemical.

23. The trap of claim 22 wherein the attractant comprises a pheromone.

24. The trap of claim 1 wherein the trap is portable.

25. The trap of claim 1 wherein the front wall has a tangent at an angle of about 90° from an angle of the base.

26. The trap of claim 1 wherein the front wall has a tangent at an angle of less than about 90° from an angle of the base.

27. The trap of claim 1 wherein the front wall has a tangent at an angle of about 45°-75° from an angle of the base.

* * * * *